United States Patent [19]

Ohira et al.

[11] Patent Number: 4,725,896
[45] Date of Patent: Feb. 16, 1988

[54] MAGNETIC RECORDING APPARATUS FOR RECORDING TWO KINDS OF MUTUALLY DIFFERENT INFORMATION SIGNALS ON INDEPENDENT TRACKS OF A MAGNETIC TAPE

[75] Inventors: Tsunehisa Ohira, Sagamihara; Masato Mihara, Hiratsuka; Osamu Inoue, Yokohama, all of Japan

[73] Assignee: Victor Company of Japan, Ltd., Yokohama, Japan

[21] Appl. No.: 899,544

[22] Filed: Aug. 22, 1986

[30] Foreign Application Priority Data

| Aug. 23, 1985 | [JP] | Japan | 60-185587 |
| Sep. 4, 1985 | [JP] | Japan | 60-195643 |
| Sep. 4, 1985 | [JP] | Japan | 60-195464 |
| Sep. 4, 1985 | [JP] | Japan | 60-195644 |
| Sep. 4, 1985 | [JP] | Japan | 60-195645 |
| Oct. 8, 1985 | [JP] | Japan | 60-222630 |

[51] Int. Cl.$^4$ .............................................. H04N 9/80
[52] U.S. Cl. .................................... 358/330; 358/328; 360/19.1
[58] Field of Search ............... 360/33.1; 358/310, 327, 358/328, 330

[56] References Cited

U.S. PATENT DOCUMENTS

| 4,296,430 | 10/1981 | Warren | 358/328 |
| 4,593,327 | 6/1986 | Hirota et al. | 358/330 |
| 4,608,611 | 8/1986 | Ota | 358/328 |
| 4,647,983 | 3/1987 | Ota | 358/330 |
| 4,656,527 | 4/1987 | Uchimi | 358/310 |

Primary Examiner—Donald McElheny, Jr.
Attorney, Agent, or Firm—Michael N. Meller

[57] ABSTRACT

A magnetic recording apparatus for recording two kinds of mutually different information signals on independent tracks of a magnetic tape comprises first through fourth rotary magnetic heads. The third and fourth heads are mounted on a rotary body at positions respectively in vicinities of the first and second heads along a rotating direction of the rotary body. The height positions of the third and fourth heads on the rotary body are different from the height positions of the first and second head. An extremely narrow guard band or no guard band is formed between two adjacent tracks recorded with the same kind of information signal. On the other hand, a wide guard band is formed between two adjacent tracks recorded with different kinds of information signals.

11 Claims, 29 Drawing Figures

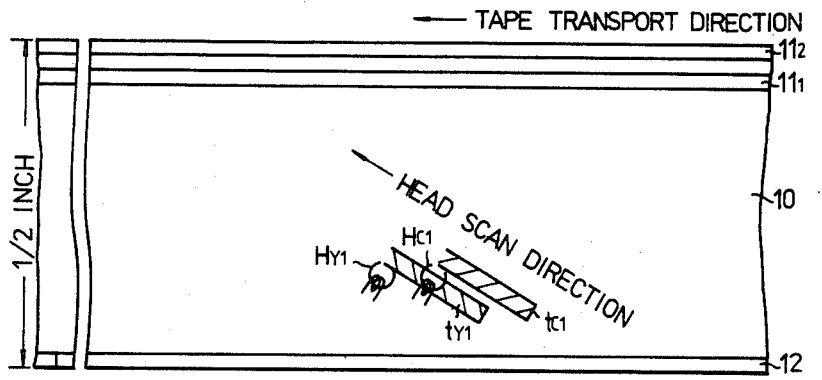
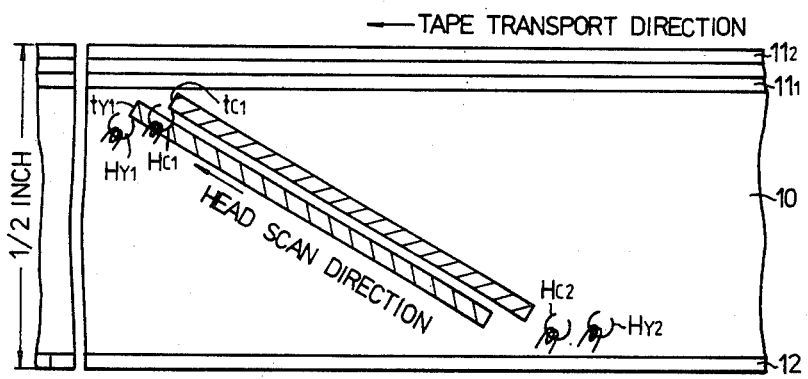
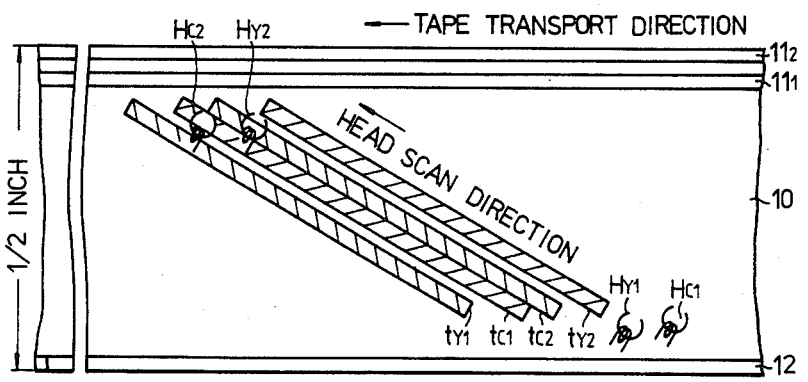

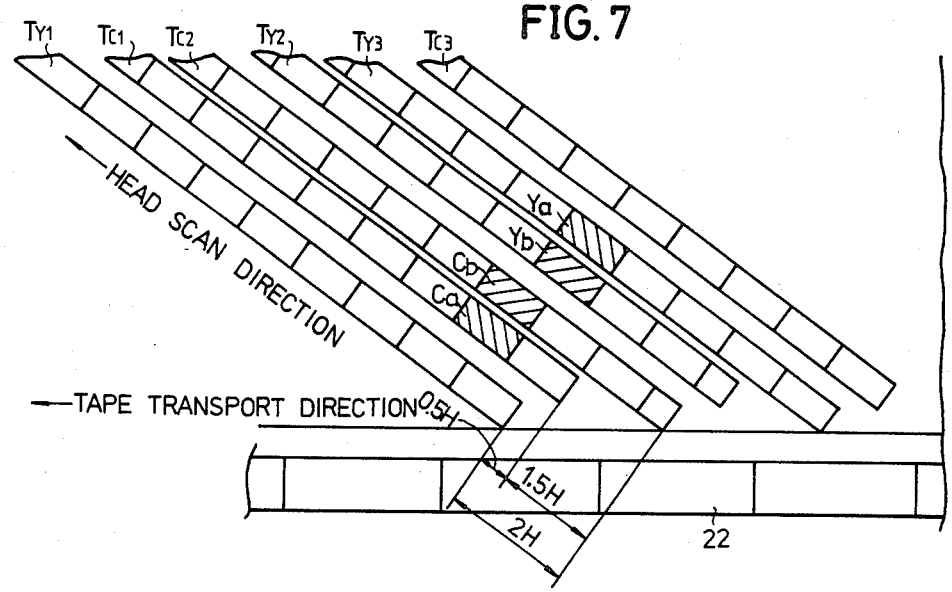
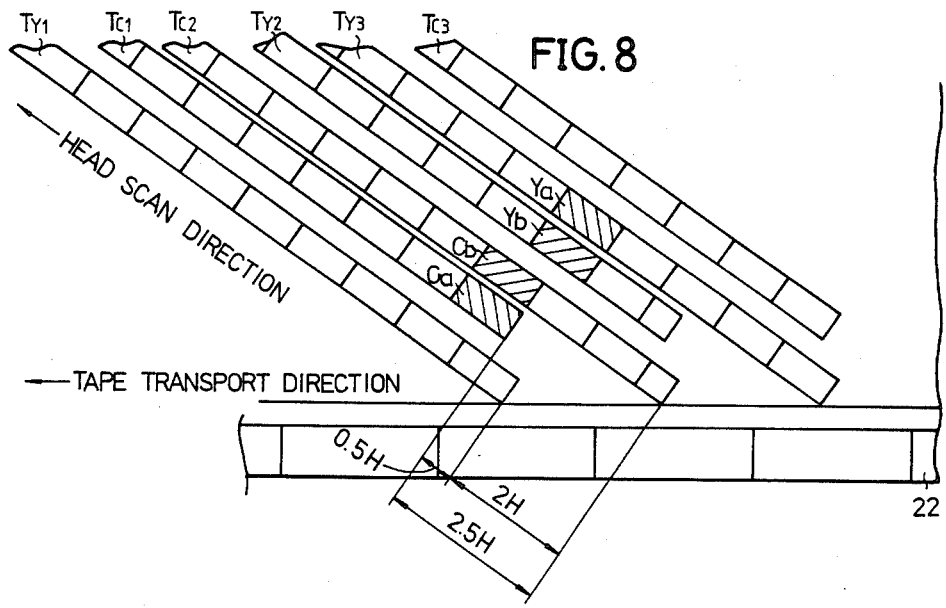

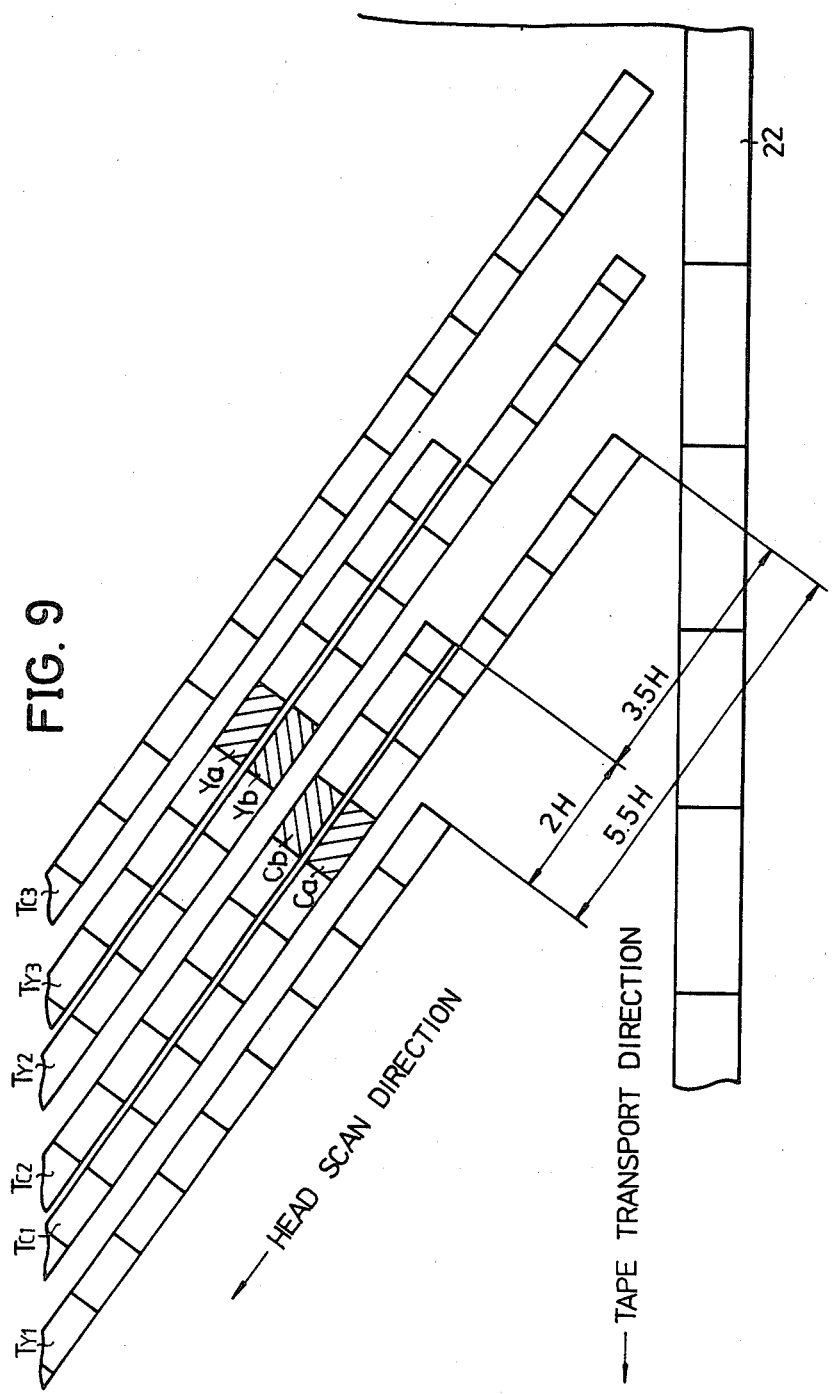

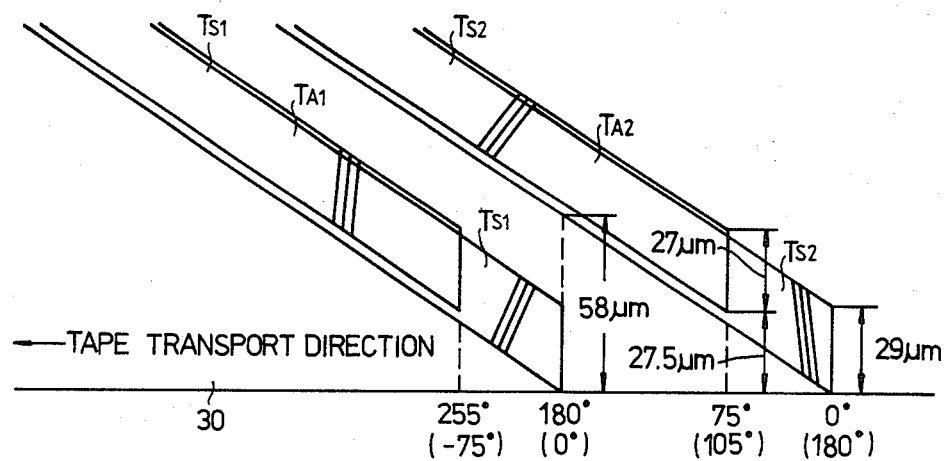
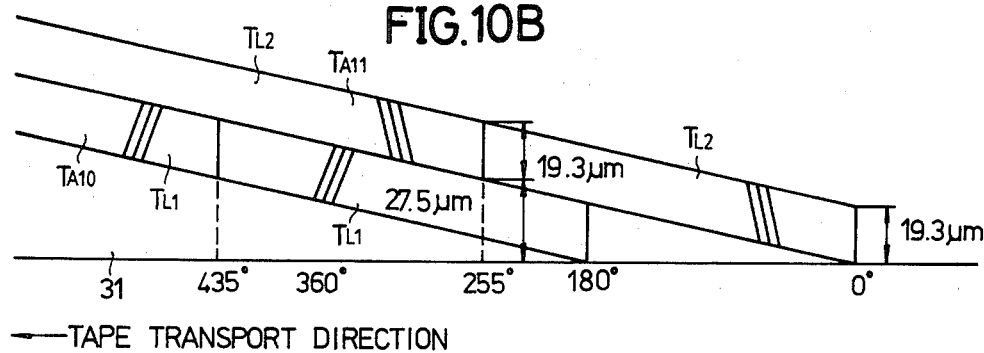

MAGNETIC RECORDING APPARATUS FOR RECORDING TWO KINDS OF MUTUALLY DIFFERENT INFORMATION SIGNALS ON INDEPENDENT TRACKS OF A MAGNETIC TAPE

BACKGROUND OF THE INVENTION

The present invention generally relates to magnetic recording apparatuses for recording two kinds of mutually different information signals on independent tracks of a magnetic tape, and more particularly to a magnetic recording apparatus which records two kinds of mutually different information signals on two independent tracks of the magnetic tape by simultaneously forming the two independent tracks by use of two rotary magnetic heads having mutually different height positions.

Presently, a helical scan type magnetic recording and/or reproducing apparatus (hereinafter simply referred to as a video tape recorder or VTR) for home use which plays a magnetic tape having a width of ½ inch employs the so-called low band conversion color recording and reproducing system because the recording and reproducing frequency band of the VTR for home use is relatively narrow. According to the low band conversion color recording and reproducing system, a luminance signal separated from a color video signal is frequency-modulated, and a carrier chrominance signal separated from the color video signal is frequency-converted into a frequency band lower than a frequency band of the frequency modulated (FM) luminance signal. The FM luminance signal and the frequency converted carrier chrominance signal are frequency-division-multiplexed into a frequency division multiplexed signal, and this frequency division multiplexed signal is recorded on and reproduced from the magnetic tape. Furthermore, in order to improve the tape utilization efficiency, no guard band is formed between two mutually adjacent tracks on the magnetic tape by setting rotary magnetic heads which record the two mutually adjacent tracks to have gaps of different azimuth angles.

On the other hand, in the case of a VTR for commercial use mainly for broadcasting and especially a one-body VTR for broadcasting use having a camera integrally built therein, there are demands to reduce the size and weight of the VTR and also obtain a reproduced color video signal of a high picture quality. For this reason, the VTR for commercial use employs a system wherein the luminance signal and the color signal are recorded on and reproduced from independent tracks of a magnetic tape having the same width as that used in the VTR for home use by independent rotary magnetic heads, with a guard band formed between two mutually adjacent tracks.

The one-body VTR for broadcasting use having the camera integrally built therein employs a luminance/-color (Y/C) separation recording and reproducing system according to which the luminance signal and the color difference signals are recorded on and reproduced from independent tracks of the magnetic tape. Hence, although a moire is generated in the VTR which employs the low band conversion color recording and reproducing system because the FM luminance signal and the frequency converted carrier chrominance signal are simultaneously recorded on the same track of the magnetic tape which is a non-linear transmission system, such a moire will not be generated in the one-body VTR for broadcasting use. In addition, the luminance signal and the color difference signals can be recorded and reproduced in sufficiently wide frequency bands. Moreover, since the one-body VTR for broadcasting use does not carry out a bias recording of the frequency converted carrier chrominance signal by the FM luminance signal, it is possible to improve a signal-to-noise (S/N) ratio of reproduced color difference signals. Therefore, according to the one-body VTR for broadcasting use, it is possible to obtain a reproduced color video signal of a high picture quality compared to the VTR which employs the low band conversion color recording and reproducing system.

However, the conventional one-body VTR for broadcasting use suffers a problem in that the tape utilization efficiency is poor because the guard band is provided between two mutually adjacent tracks. In addition, since an FM luminance signal and an FM color difference signal are independently recorded on the two mutually adjacent tracks, a rotary magnetic head for reproducing the FM luminance signal (or a rotary magnetic head for reproducing the FM color difference signal) will reproduce the recorded FM color difference signal (or the recorded FM luminance signal) when the rotary magnetic head traverses the guard band and scans a track which is adjacent to the intended track which is to be scanned. In the case of the one-body VTR for broadcasting use, there is no field correlation between the signals reproduced from the two mutually adjacent tracks of the magnetic tape, and it is therefore impossible to cancel the crosstalk by using the field correlation as is done in the VTR which employs the low band conversion color recording and reproducing system. As a result, the one-body VTR for broadcasting use also suffers a problem in that the crosstalk is conspicuous in the reproduced picture when the rotary magnetic head scans the track which is adjacent to the intended track which is to be scanned.

It is possible to conceive a method of reducing the crosstalk described above by independently recording a tracking signal or the like on the magnetic tape and using an automatic scan tracking device for controlling the scanning position of the rotary magnetic head responsive to the tracking signal so that the rotary magnetic head accurately scans over the intended track. However, in this case, it is necessary to additionally provide the automatic scan tracking device in the VTR, and the circuit construction of the VTR becomes complex. Furthermore, there is a problem in that the VTR becomes expensive.

SUMMARY OF THE INVENTION

Accordingly, it is a general object of the present invention to provide a novel and useful magnetic recording apparatus for recording two kinds of mutually different information signals on independent tracks of a magnetic tape.

Another and more specific object of the present invention is to provide a magnetic recording apparatus which comprises first and second rotary magnetic heads mounted on a rotary body at mutually opposing positions, and third and fourth rotary magnetic heads mounted on the rotary body at mutually opposing positions respectively close to the first and second rotary magnetic heads in a rotating direction of the rotary body, and the third and fourth rotary magnetic heads are mounted on the rotary body at height positions in a direction of a rotary axis of the rotary body different from height positions of the first and second rotary magnetic heads. A first information signal is supplied to the first and third rotary heads and a second information signal is supplied to the second and fourth rotary magnetic heads, so that the first and third rotary magnetic heads simultaneously carry out a recording and the second and fourth rotary magnetic heads simultaneously carry out a recording. According to the magnetic recording apparatus of the present invention, two mutually different information signals are recorded on the two independent tracks which are simultaneously formed on a magnetic tape with a wide guard band between the two independent tracks, and the kinds of the two information signals recorded on the two independent tracks are alternately changed for every one track scanning period. In addition, the rotary heads are mounted on the rotary body at such positions that an optimum positional relationship is satisfied. As a result, it is possible to record the information signal of the same kind on two mutually adjacent tracks without a guard band or with an extremely narrow guard band, and it is possible to improve the tape utilization efficiency compared to the conventional VTR which employs the Y/C separation recording and reproducing system described before. Furthermore, it is possible to carry out a reproduction which is substantially unaffected by crosstalk even without the use of the automatic scan tracking device described before. According to the magnetic recording apparatus of the present invention, it is possible to ensure high correlation of the information between the mutually adjacent tracks especially by carrying out the recording with the so-called H-alignment in which the recorded positions of the horizontal synchronizing signals are aligned in the mutually adjacent tracks, and it is possible to further visually reduce the undesirable effects of the crosstalk from the adjacent tracks. In addition, because it is unnecessary to provide the automatic scan tracking device, the magnetic recording apparatus can be produced at a low cost.

Still another object of the present invention is to provide a magnetic recording apparatus in which the azimuth angles of gaps of the first through fourth rotary magnetic heads, the diameter of the rotary body, and the inclination of the tracks during the still picture reproduction are set to values identical to those of an existing VTR for home use. According to the magnetic recording apparatus of the present invention, it is possible to form on the magnetic tape a track pattern which can be compatibly played on the existing VTR for home use, and in this case, it is sufficient to use only a pair of rotary magnetic heads mounted at mutually opposing positions on the rotary body. As a result, the number of rotary magnetic heads is reduced to a minimum and the production cost of the magnetic recording apparatus can be reduced. Furthermore, since the track width is set approximately the same for each rotary magnetic head, it is possible to carry out a standard mode recording and an extended (long-time) mode recording by use of the same rotary magnetic head.

A further object of the present invention is to provide a magnetic recording apparatus in which the pair of the first and third rotary magnetic heads and the pair of the second and fourth rotary heads are alternately used for every one track scanning period so as to successively form on the magnetic tape two parallel tracks independently recorded with the first and second information signals in a first recording mode thereof, and out of the first through fourth rotary magnetic heads two rotary magnetic heads mounted on the rotary body at mutually opposite positions are alternately used for every one track scanning period so as to successively form on the magnetic tape a track recorded with a third information signal in a second recording mode thereof. The first and second recording modes can be selected arbitrarily. In the second recording mode, the first and second rotary magnetic heads provided on the lower side are used when the scanning direction of the rotary magnetic heads is substantially the same as a tape transporting direction in which the magnetic tape is transported, and the third and fourth rotary magnetic heads provided on the upper side are used when the scanning direction of the rotary magnetic heads is substantially opposite to the tape transporting direction. According to the magnetic recording apparatus of the present invention, a portion of the track which is formed during one track scanning period will not be erased during the next one track scanning period. In addition, an unwanted track which is formed one track scanning period before due to leakage magnetic flux of a rotary magnetic head which is originally not used can be erased when forming a track during this next one track scanning period.

Another object of the present invention is to provide a magnetic recording apparatus in which the first rotary magnetic head is mounted on the rotary body at a height position lower than that of the third rotary magnetic head and the second rotary magnetic head is mounted on the rotary body at a height position lower than that of the fourth rotary magnetic head. The first and second rotary magnetic heads are mounted at positions respectively leading the third and fourth rotary magnetic heads along the rotating direction of the rotary body, and a luminance signal and a color signal are recorded on the magnetic tape as the two kinds of information signals. According to the magnetic recording apparatus of the present invention, a time interval between two mutually adjacent tracks recorded with the same kind of video signal is extremely close to one field, and it is advantageous in cancelling the crosstalk by use of the field correlation. Further, it is possible to carry out the recording so that the recorded positions of the horizontal synchronizing signals are aligned in the mutually adjacent tracks.

Other objects and further features of the present invention will be apparent from the following detailed description when read in conjunction with the accompanying drawings.

BRIEF DESCRIPTION OF THE DRAWINGS

FIGS. 3A through 3C are diagrams for explaining recording processes of the track pattern shown in FIG. 1;

FIG. 7 shows a track pattern which is formed on the magnetic tape when a distance between the two rotary magnetic heads arranged close to each other is set to +0.5 H, where H denotes one horizontal scanning period;

FIG. 8 shows a track pattern which is formed on the magnetic tape when a distance between the two rotary magnetic heads arranged close to each other is set to −0.5 H;

FIG. 9 shows a track pattern which is formed on the magnetic tape when a distance between the two rotary magnetic heads arranged close to each other is set to +5.5 H;

FIGS. 10A and 10B show track patterns formed on the magnetic tape during a standard recording mode and an extended (long-time) recording mode, respectively;

DETAILED DESCRIPTION

Figure 1:
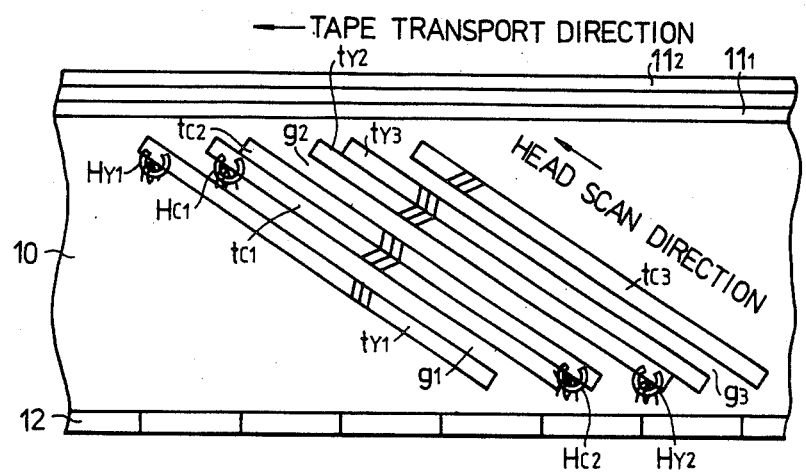
FIG. 1 shows a first embodiment of a track pattern formed on a magnetic tape in the magnetic recording apparatus according to the present invention.

In FIG. 1, two audio tracks $11_1$ and $11_2$ are formed along a longitudinal direction of a magnetic tape 10 in an upper end portion thereof A control track 12 which is recorded with control pulses having a constant period (for example, one frame) is formed along the longitudinal direction of the tape 10 in a lower end portion thereof. A luminance signal is frequency-modulated and is recorded as a first information signal on tracks $t_{Y1}$, $t_{Y2}$ and $t_{Y3}$ each amounting to one field (actually, including in addition an overlap recording period). For example, two kinds of color difference signals frequency-modulate two different carriers to obtain two kinds of frequency modulated (FM) color difference signals, and the two kinds of FM color difference signals are frequency-division-multiplexed and recorded as a second information signal on tracks $t_{C1}$, $t_{C2}$ and $t_{C3}$ each amounting to one field (actually, including in addition an overlap recording period). The tracks $t_{Y1}$, $t_{Y2}$ and $t_{Y3}$ and the tracks $t_{C1}$, $t_{C2}$ and $t_{C3}$ are respectively formed obliquely to the longitudinal direction of the tape 10. During one field period, the independent tracks $t_{Y1}$ and $t_{C1}$ are formed simultaneously by a first rotary magnetic head $H_{Y1}$ a third rotary magnetic head $H_{C1}$ shown in FIG. 2 with a wide guard band g1 formed between the two tracks $t_{Y1}$ and $t_{C1}$. During the next one field period, the independent tracks $t_{C2}$ and $t_{Y2}$ are formed simultaneously by a second rotary magnetic head $H_{C2}$ and a fourth rotary magnetic head $H_{Y2}$ in FIG. 2 with a wide guard band g2 formed between the two tracks $t_{C2}$ and $t_{Y2}$. Furthermore, during the next one field period, the independent tracks $t_{Y3}$ and $t_{C3}$ are formed simultaneously by the first and third heads $H_{Y1}$ and $H_{C1}$ with a wide guard band g3 formed between the two tracks $t_{Y3}$ and $t_{C3}$. No guard band is formed between the tracks $t_{Y2}$ and $t_{Y3}$, and no guard band is formed between the tracks $t_{C1}$ and $t_{C2}$. It is possible to form an extremely narrow guard band between the tracks $t_{Y3}$ and $t_{C3}$ and between the tracks $t_{C1}$ and $t_{C2}$.

Figure 2:
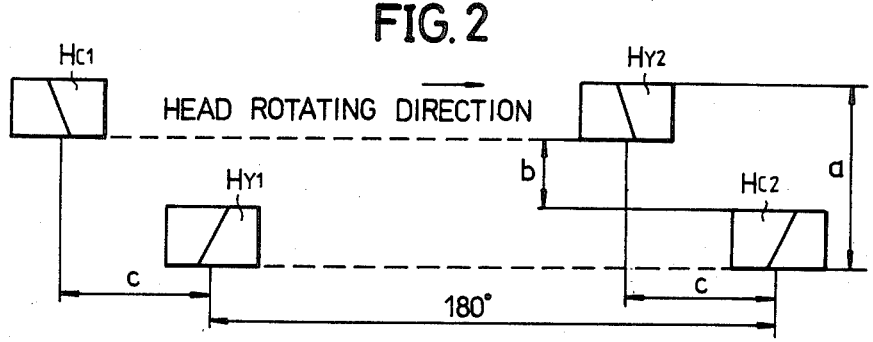
FIG. 2 shows a first embodiment of an arrangement of rotary magnetic heads in the magnetic recording apparatus according to the present invention.

Next, description will be given with respect to the arrangement of the heads in the magnetic recording apparatus according to the present invention. As shown in FIG. 2, the first and second heads $H_{Y1}$ and $H_{C2}$ are mounted on a rotary body (not shown) at mutually opposing positions having an angular separation of 180° on a rotational plane of the rotary body. The third and fourth heads $H_{C1}$ and $H_{Y2}$ are mounted on the rotary body at mutually opposing positions having an angular separation of 180° on the rotational plane of the rotary body. The heads $H_{C1}$ and $H_{Y2}$ are mounted at such positions on the rotational plane of the rotary body that the heads $H_{C1}$ and $H_{Y2}$ respectively lag the heads $H_{Y1}$ and $H_{C2}$ by a distance c in a rotating direction of the rotary body. In addition, the heads $H_{Y1}$, $H_{Y2}$, $H_{C1}$ and $H_{C2}$ are mounted at such height positions on the rotary body that upper ends of the heads $H_{C1}$ and $H_{Y2}$ are higher than lower ends of the heads $H_{Y1}$ and $H_{C2}$ by a distance a in a direction along a rotary axis of the rotary body. A distance b between lower ends of the heads $H_{C1}$ and $H_{Y2}$ and upper ends of the heads $H_{Y1}$ and $H_{C2}$ is determined by the width of the guard bands g1 through g3.

The heads $H_{Y1}$ and $H_{C2}$ have gaps of the same azimuth angle $+\alpha°$, for example, and the heads $H_{C1}$ and $H_{Y2}$ have gaps of the same azimuth angle $-\alpha°$. Accordingly, the azimuth angles are mutually different between the heads $H_{C1}$ and $H_{Y1}$ which record signals related to the same field and between the heads $H_{C2}$ and $H_{Y2}$ which record signals related to the same field. In addition, the azimuth angles are mutually different between the heads $H_{C1}$ and $H_{C2}$ and between the heads $H_{Y1}$ and $H_{Y2}$.

When carrying out the recording by use of the heads having the arrangement shown in FIG. 2, the independent first and second tracks $t_{Y1}$ and $t_{C1}$ are first formed simultaneously by the heads $H_{Y1}$ and $H_{C1}$ with a guard band having the predetermined width b shown in FIG. 2, as shown in FIG. 3A. Then, at the same time as when the recording amounting to one field is completed by the heads $H_{Y1}$ and $H_{C1}$ as shown in FIG. 3B, the heads $H_{C2}$ and $H_{Y2}$ start to form the third and fourth tracks $t_{C2}$ and $t_{Y2}$. In this state, the guard band having the predetermined width b is formed between the tracks $t_{Y1}$ and $t_{C1}$. Next, at the same time as when the recording amounting to one field is completed by the heads $H_{C2}$ and $H_{Y2}$ as shown in FIG. 3C, the heads $H_{Y1}$ and $H_{C1}$ start to form the tracks $t_{Y3}$ and $t_{C3}$. In this state, a guard band is formed between the tracks $t_{C2}$ and $t_{Y2}$, but no guard band is formed between the tracks $t_{C1}$ and $t_{C2}$. It is possible to form an extremely narrow guard band between the tracks $t_{C1}$ and $t_{C2}$. As a result, the track pattern shown in FIG. 1 is formed on the tape 10.

As may be seen from FIG. 1, the FM luminance signals and the FM color difference signals having no field correlation with each other are recorded by the respective head $H_{Y1}$ and $H_{Y2}$ having the gaps of mutually opposite azimuth angles and the heads $H_{C1}$ and $H_{C2}$ having gaps of mutually opposite azimuth angles, with a guard band formed between the tracks formed by the heads $H_{Y1}$ and $H_{C1}$ and between the tracks formed by the heads $H_{C2}$ and $H_{Y2}$. As a result, a crosstalk is prevented from being generated from the adjacent track recorded with the different kind of information signal. In addition, the FM luminance signals having the field correlation and the FM color difference signals having the field correlation are respectively recorded by the heads having the gaps of mutually opposite azimuth angles so that the recorded positions of the horizontal synchronizing signals are aligned in the adjacent tracks. Such alignment of the recorded positions of the horizontal synchronizing signals is often referred to as an H-alignment. For this reason, it is possible to cancel the crosstalk from the adjacent track recorded with the same kind of information signal in a reproduced signal processing system by use of the field correlation. Thus, it is unnecessary to provide a guard band between the tracks $t_{C1}$ and $t_{C2}$ and between the tracks $t_{Y1}$ and $t_{Y2}$ which are respectively recorded with the same kind of information signal, and consequently, the recording density of the tape 10 is increased.

Figure 4:
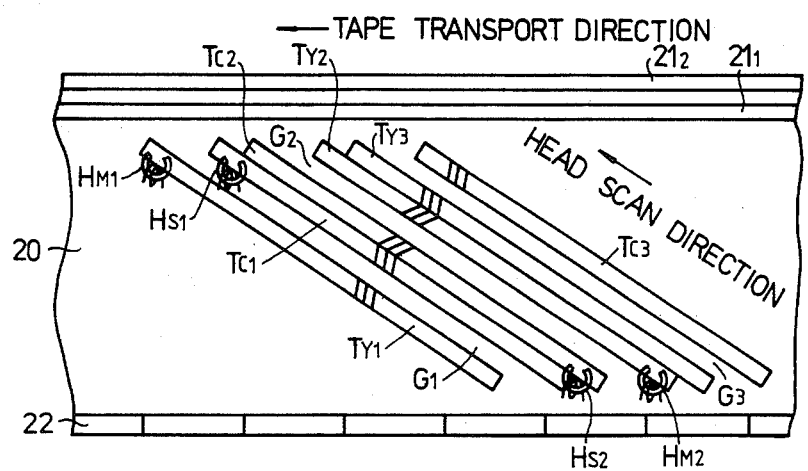
FIG. 4 shows a second embodiment of the track pattern formed on the magnetic tape in the magnetic recording apparatus according to the present invention.

Next, description will be given with respect to a second embodiment of the track pattern formed by the present invention in conjunction with FIGS. 4 through 6, by referring to the arrangement of the heads and the like for forming the track pattern. In FIG. 4, a magnetic tape 20 is transported at a tape transport speed (for example, at a speed of 74 microns to 77 microns in one-half revolution period of the rotary body (one field)) which is faster than a standardized tape transport speed during a standard mode of the VTR employing the low band conversion color recording and reproducing system described before. Two audio tracks 21 are formed in the upper end portion of the tape 20 along the longitudinal direction thereof, and a control track 22 is formed in the lower end portion of the tape 20 along the longitudinal direction thereof. A luminance signal is frequency-modulated and is recorded as a first information signal on tracks $T_{Y1}$, $T_{Y2}$ and $T_{Y3}$ each amounting to one field (actually, including in addition an overlap recording period). For example, two kinds of color difference signals frequency-modulate two different carriers to obtain two kinds of frequency modulated (FM) color difference signals, and the two kinds of FM color difference signals are frequency-division-multiplexed and recorded as a second information signal on tracks $T_{C1}$, $T_{C2}$ and $T_{C3}$ each amounting to one field (actually, including in addition an overlap recording period). The tracks $T_{Y1}$, $T_{Y2}$ and $T_{Y3}$ and the tracks $T_{C1}$, $T_{C2}$ and $T_{C3}$ are respectively formed obliquely to the longitudinal direction of the tape 20. During one field period, the independent tracks $T_{Y1}$ and $T_{C1}$ are formed simultaneously by a first rotary magnetic head $H_{M1}$ and a third rotary magnetic head $H_{S1}$ with a wide guard band $G_1$ formed between the two tracks $T_{Y1}$ and $T_{C1}$. During the next one field period, the independent tracks $T_{C2}$ and $T_{Y2}$ are formed simultaneously by a second rotary magnetic head $H_{S2}$ and a fourth rotary magnetic head $H_{M2}$ with a wide guard band $G_2$ formed between the two tracks $T_{C2}$ and $T_{Y2}$. Furthermore, during the next one field period, the independent tracks $T_{Y3}$ and $T_{C3}$ are formed simultaneously by the first and third heads $H_{M1}$ and $H_{S1}$ with a wide guard band $G_3$ formed between the two tracks $T_{Y3}$ and $T_{C3}$. No guard band is formed between the tracks $T_{Y2}$ and $T_{Y3}$, and no guard band is formed between the tracks $T_{C1}$ and $T_{C2}$. It is possible to form an extremely narrow guard band between the tracks $T_{Y3}$ and $T_{C3}$ and between the tracks $T_{C1}$ and $T_{C2}$.

FIG. 4 shows the state where the heads $H_{M1}$ and $H_{S1}$ have reached terminal portions of the respective tracks $T_{Y1}$ and $T_{C1}$ and the head $H_{S2}$ and $H_{M2}$ have reached starting portions of the next tracks $T_{C2}$ and $T_{Y2}$.

According to the present embodiment, the FM luminance signal and the FM color difference signals, for example, are recorded simultaneously on the two independent tracks, and no guard band (or an extremely narrow guard band) is formed between the two mutually adjacent tracks ($T_{C1}$ and $T_{C2}$, $T_{Y2}$ and $T_{Y3}$) recorded with the same kind of information signal and the wide guard band is formed between the two mutually adjacent tracks ($T_{Y1}$ and $T_{C1}$, $T_{C2}$ and $T_{Y2}$, $T_{Y3}$ and $T_{C3}$) recorded with the different kinds of information signals, as in the case of the first embodiment. However, according to the present embodiment, the two tracks which are recorded simultaneously are formed by the heads having the gaps of the same azimuth angle, and the heads have gaps of azimuth angles selected identical to those of the heads used in the existing VTR for home use, unlike in the case of the first embodiment.

Next, description will be given with respect to the arrangement of the heads for forming the track pattern shown in FIG. 4. As shown in FIG. 5, the heads $H_{M1}$ and $H_{S2}$ are mounted on a rotary body (not shown) such as a rotary drum at mutually opposing positions having an angular separation of 180° on a rotational plane of the rotary body. The heads $H_{S1}$ and $H_{M2}$ are mounted on the rotary body at mutually opposing positions having an angular separation of 180° on the rotational plane of the rotary body. The heads $H_{S1}$ and $H_{M2}$ are mounted at such positions on the rotational plane of the rotary body that the heads $H_{S1}$ and $H_{M2}$ respectively lag the heads $H_{M1}$ and $H_{S2}$ by a distance c in a rotating direction of the rotary body. In addition, the heads $H_{M1}$, $H_{M2}$, $H_{S1}$ and $H_{S2}$ are mounted at such height positions on the rotary body that lower ends of the heads $H_{S1}$ and $H_{M2}$ are 45 microns higher than lower ends of the heads $H_{M1}$ and $H_{S2}$ in a direction along a rotary axis of the rotary body. The heads $H_{M1}$, $H_{M2}$, $H_{S1}$ and $H_{S2}$ have a track width of 29 microns and have gaps of azimuth angles which are identical to the standardized azimuth angles of gaps of the rotary magnetic heads used in the existing VTR for home use employing the low band conversion color recording and reproducing system. Hence, the heads $H_{M1}$ and $H_{S1}$ have gaps of the same azimuth angle of $+6°$, and the heads $H_{M2}$ and $H_{S2}$ have gaps of the same azimuth angle of $-6°$.

A rotary magnetic head $H_{A2}$ exclusively for recording the audio signal is mounted at such a position on the rotational plane of the rotary body that the head $H_{A2}$ leads the head $H_{M1}$ by 75° along the rotating direction of the rotary body. Furthermore, the head $H_{A2}$ is mounted at such a height position that a lower end of the head $H_{A2}$ is 27.5 microns higher than the lower ends of the heads $H_{M1}$ and $H_{S2}$ in the direction along the rotary axis of the rotary body. In addition, a rotary magnetic head $H_{A1}$ exclusively for recording the audio signal is mounted at the same height position as the head $H_{A2}$ at a mutually opposing positions having an angular separation of 180° on the rotational plane of the rotary body. Accordingly, the head $H_{A1}$ is mounted at a position on the rotational plane of the rotary body leading the head $H_{M1}$ by 255° along the rotating direction of the rotary body. The heads $H_{A1}$ and $H_{A2}$ have a track width of 27 microns, and the head $H_{A1}$ has a gap of an azimuth angle of $+30°$ and the head $H_{A2}$ has a gap of an azimuth angle of $-30°$.

Figure 6A:
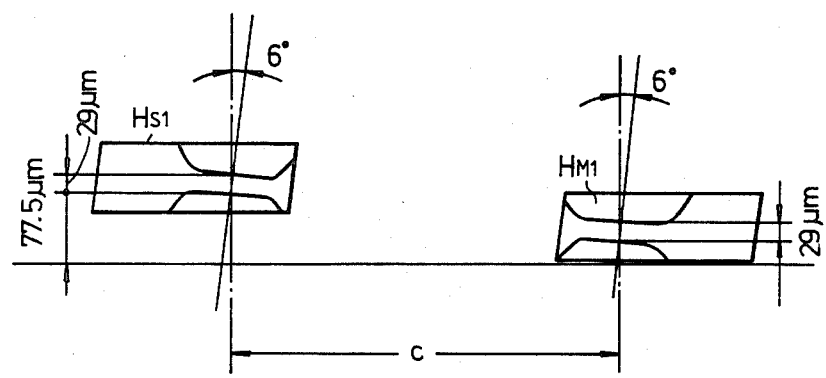
FIGS. 6A and 6B are diagrams for explaining the construction of two rotary magnetic heads arranged close to each other.
Figure 6B:
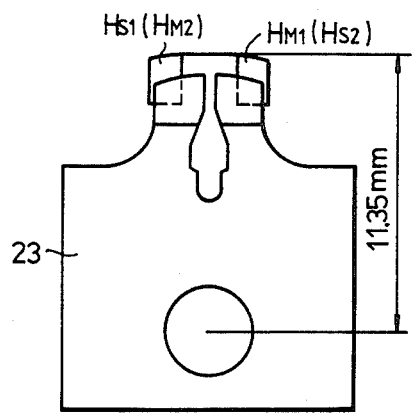

FIG. 6A shows the heads $H_{S1}$ and $H_{M1}$ viewed from the direction of the sliding contact surfaces thereof. As will be described later on in the present specification, the distance c between the gaps of the heads $H_{S1}$ and $H_{M1}$ is set so that the recording can be carried out with the H-alignment. As shown in FIG. 6B, the heads $H_{S1}$ and $H_{M1}$ are fixed to a tip end of a single head base 23. The heads $H_{S2}$ and $H_{M2}$ are similarly fixed to another head base.

When taking into consideration the compatibility of the magnetic tape between the magnetic recording apparatus according to the present invention and the existing VTR for home use employing the low band conversion color recording and reproducing system, the rotary body which is mounted with the heads $H_{M1}$, $H_{M2}$, $H_{S1}$ and $H_{S2}$ and is wrapped obliquely with the magnetic tape on the outer periphery thereof for a predetermined angular range greater than 180° must have a diameter identical to that of a rotary body used in the existing VTR for home use. In addition, the inclination angle of the scanning locus of the head in the still reproduction mode in which the magnetic tape is stopped from being transported must be identical to that of the existing VTR for home use. When an attempt is made to satisfy the above two conditions and form the track pattern shown in FIG. 4 by making the tape transport speed faster than that during the standard mode of the existing VTR for home use and also carry out the recording with the H-alignment, the recording time becomes a specific value. On the other hand, when an attempt is made so as to obtain a desired recording time, it is impossible to carry out the recording with the H-alignment. However, even when the tape transport speed is made faster than that during the standard mode of the existing VTR for home use, it is possible to carry out the recording with the H-alignment by appropriately setting the distance c between the upper head $H_{S1}$ (or $H_{M2}$) and the lower head $H_{M1}$ (or $H_{S2}$).

For example, out of the tracks which are successively formed for every one field by the heads $H_{M1}$ and $H_{S2}$ (or the heads $H_{S1}$ and $H_{M2}$) which are mounted at mutually opposing positions with an angular separation of 180°, in the case where the starting end of the track formed in a certain field is located at a position which is separated by 2H along the track width direction from a starting end of the track formed in the next field, where H denotes one horizontal scanning period, the track pattern becomes as shown in FIG. 7 when the distance c is set to $+0.5H$. In the present specification, such a track pattern will be referred to as a track pattern with a 2H shift. As may be seen from FIG. 7, the two mutually adjacent tracks recorded with the same kind of information signal, that is, the tracks $T_{C1}$ and $T_{C2}$ (or the tracks $T_{Y2}$ and $T_{Y3}$) are recorded with the H-alignment and the recorded positions of the horizontal synchronizing signals are aligned in the track width direction as indicated by solid lines. In addition, two mutually adjacent signals (for example, Ca and Cb, or Ya and Yb) have a time interval (mutual time difference) of one field plus 1.5H.

On the other hand, in the case where the distance c is set to $-0.5H$ in the track pattern with the 2H shift, that is, when the upper heads $H_{S1}$ and $H_{M2}$ are positioned to lead the lower heads $H_{M1}$ and $H_{S2}$ by 0.5H in the rotating direction of the rotary body, a track pattern shown in FIG. 8 is formed on the magnetic tape. As shown in FIG. 8, the two mutually adjacent tracks recorded with the same kind of information signal are recorded with the H-alignment, however, the time interval between the two mutually adjacent signals Ya and Yb (or Ca and Cb) is one field plus 2.5H. Thus, the time interval between the two mutually adjacent signals is 1H longer than that of the track pattern shown in FIG. 7.

In order to carry out a crosstalk cancelling operation at the time of the reproduction by use of the field correlation, it is desirable that the time interval between the two mutually adjacent signals is close as much as possible to one field so that the signal contents of the two mutually adjacent signals closely resemble each other. Hence, it is more desirable to set the distance c to $+0.5H$ rather than $-0.5H$. In other words, it is more advantageous from the point of view of carrying out the recording with the H-alignment and carrying out the crosstalk cancelling operation when the lower heads $H_{M1}$ and $H_{S2}$ are mounted at positions leading the respective upper heads $H_{S1}$ and $H_{M2}$ along the rotating direction of the rotary body.

A track pattern shown in FIG. 9 is formed on the magnetic tape when the distance c is set to $+5.5H$ in the track pattern with the 2H shift. As shown in FIG. 9, the two mutually adjacent tracks recorded with the same kind of information signal are recorded with the H-alignment, and the time interval between the two mutually adjacent signals Ya and Yb (or Ca and Cb) is one field plus 3.5H.

In each of the track patterns shown in FIGS. 7 through 9, each track has a track width of 29 microns and a track pitch of the tracks is 77 microns. An extremely narrow guard band having a width of 3 microns is formed between the two mutually adjacent tracks recorded with the same kind of information signal. On the other hand, a wide guard band having a width of 16 microns is formed between the two mutually adjacent tracks (for example, the tracks $T_{Y1}$ and $T_{C1}$, $T_{C2}$ and $T_{Y2}$, and $T_{Y3}$ and $T_{C3}$) recorded with different kinds of information signals.

According to the present embodiment, the wide guard band is formed between the two mutually adjacent tracks recorded with the different kinds of information signals. For this reason, even when such two independent mutually adjacent tracks are formed simultaneously by the heads $H_{M1}$ and $H_{S1}$ (or the heads $H_{M2}$ and $H_{S2}$) having gaps of the same azimuth angle, virtually no crosstalk is mixed into the reproduced signal from the adjacent track. On the other hand, no guard band or only an extremely narrow guard band is formed between the two mutually adjacent tracks recorded with the same kind of information signal. However, since such two mutually adjacent tracks are formed by the heads $H_{M1}$ and $H_{M2}$ (or the heads $H_{S1}$ and $H_{S2}$) having gaps of mutually different azimuth angles, virtually no crosstalk is generated from the adjacent track due to the azimuth loss effect. Even when the crosstalk is generated from the adjacent track, it is possible to effectively reduce the crosstalk because the recording is carried out with the H-alignment. Further, since the two mutually adjacent signals (luminance signals, color difference signals) recorded in the two mutually adjacent tracks have the field correlation and closely resemble each other, it is possible to carry out the crosstalk cancelling operation by use of the field correlation. Therefore, the crosstalk does not become a problem even without the use of the automatic scan tracking device.

Figure 5:
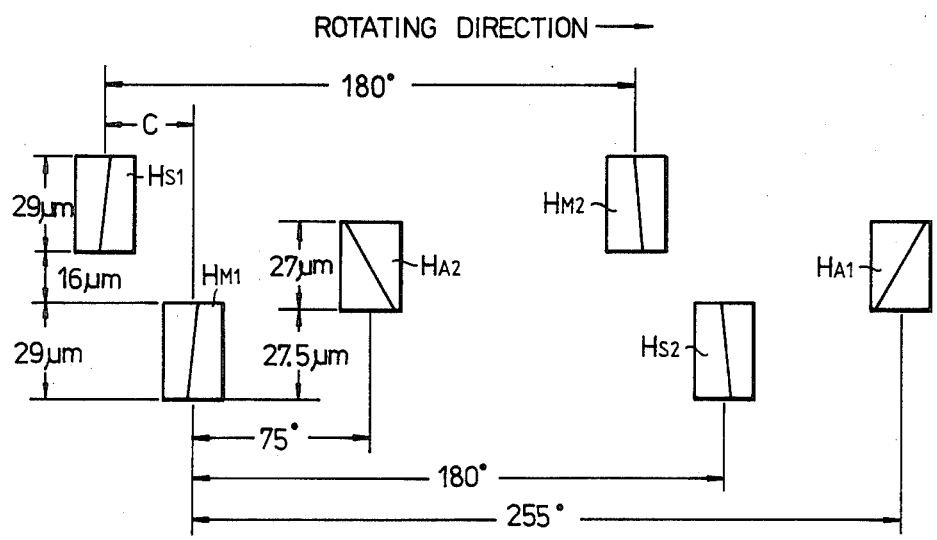
FIG. 5 shows a second embodiment of the arrangement of the rotary magnetic heads in the magnetic recording apparatus according to the present invention.

In the case where the recording is to be carried out based on the Y/C separation recording and reproducing system described before, that is, in a first recording mode, the heads $H_{A1}$ and $H_{A2}$ shown in FIG. 5 are not used.

Next, description will be given for the case where the recording is carried out based on the low band conversion color recording system, that is, in a second recording mode. The recording is carried out by the heads $H_{M1}$ and $H_{S2}$ or the heads $H_{S1}$ and $H_{M2}$ while transporting the magnetic tape at a speed identical to that during a standard mode or an extended (long-time) mode of the existing VTR for home use. The heads $H_{A1}$ and $H_{A2}$ are used in this case. It is possible to use either the upper heads $H_{S1}$ and $H_{M2}$ or the lower heads $H_{M1}$ and $H_{S2}$, but the lower heads $H_{M1}$ and $H_{S2}$ are used in the present embodiment for the following reasons.

For example, it will be assumed that the tape transporting direction and the scanning direction of the heads are generally in the same direction, the magnetic tape is transported at such a speed that the track pitch becomes 58 microns which is identical to that obtained in the standard mode of the existing VTR for home use, the track width of the first through fourth heads is 29 microns as shown in FIG. 5, and the third and fourth heads are mounted at height positions 16 microns higher than those of the first and second heads. In this case, the first head $H_{M1}$ scans over a scanning locus which is oblique to the longitudinal direction of the magnetic tape as indicated by a solid line T1 in FIG. 11 during a certain one track scanning period. At the same time, the third head $H_{S1}$ scans over a scanning locus which is oblique to the longitudinal direction of the magnetic tape as indicated by a solid line T3. During the next one track scanning period, the second head $H_{S2}$ scans over a scanning locus indicated by a one-dot chain line T2, and at the same time, the fourth head $H_{M2}$ scans over a scanning locus T4 indicated by a one-dot chain line.

Figure 11:
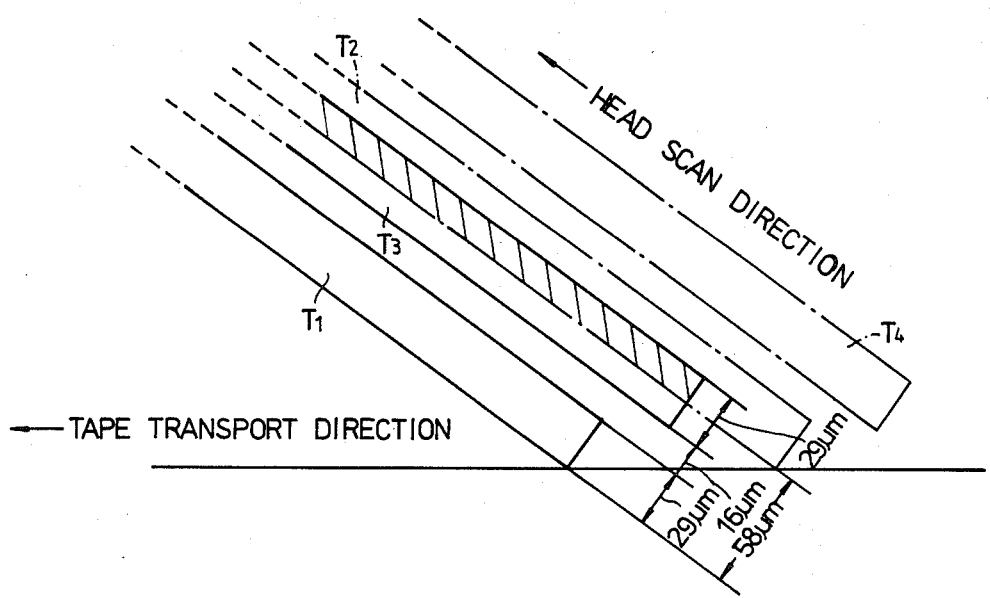
FIG. 11 shows head scanning loci for explaining the operation of the rotary heads used in the standard recording mode of the magnetic recording apparatus according to the present invention.

Accordingly, as may be seen from FIG. 11, an upstream side portion of the scanning locus T3 of the third head $H_{S1}$, which portion is indicated by hatchings and has a width of 16 ($=29-58+45$) microns, is scanned by the second head $H_{S2}$ during the next one track scanning period. For this reason, when the upper third and fourth heads $H_{S1}$ and $H_{M2}$ are used to record the information signal, the second head $H_{S2}$ will scan over a portion of the track which is formed by the third head $H_{S1}$, and the first head $H_{M1}$ will scan over a portion of the track which is formed by the fourth head $H_{M2}$. In this case, measures are taken so that the recording current is not supplied to the first and second heads $H_{M1}$ and $H_{S2}$. However, when the leakage magnetic flux from the fourth head $H_{M2}$ reaches the second head $H_{S2}$, the second head $H_{S2}$ will erase a portion of the track which is formed by the third head $H_{S1}$ due to the leakage magnetic flux, although the erasure will only be to a small extent.

On the other hand, when the lower first and second heads $H_{M1}$ and $H_{S2}$ are used, even if the leakage magnetic flux should reach the third and fourth heads $H_{S1}$ and $H_{M2}$ and signals are recorded by the third and fourth heads $H_{S1}$ and $H_{M2}$, the first and second heads $H_{M1}$ and $H_{S2}$ will thereafter record the information signal. Hence, out of the portions recorded due to the leakage magnetic flux, it is possible to erase those portions which are scanned by the first and second heads $H_{M1}$ and $H_{S2}$, and furthermore, the track recorded with the information signal will not be erased. For these reasons, in the second recording mode, the information signal is recorded by the lower first and second heads $H_{M1}$ and $H_{S2}$.

In the case where the tape transporting direction is substantially opposite to the head scanning direction, that is, in the case where the tape transporting direction is opposite to that shown in FIG. 11, the upper heads scan over portions of the scanning loci of the lower heads. Hence, the information signal is recorded by the upper third and fourth heads.

FIG. 10A shows a track pattern formed in the standard mode. A magnetic tape 30 is transported at such a speed that the track pitch is 58 microns. The head $H_{S2}$ starts to record the frequency division multiplexed signal amounting to one field on a video track $T_{S1}$ having a track width of 29 microns. As described before, this frequency division multiplexed signal comprises the FM luminance signal and the frequency converted carrier chrominance signal occupying an unoccupied frequency band on the lower side of the frequency band occupied by the FM luminance signal. At a time when the head $H_{S2}$ has rotated an angle of 75°, the head $H_{S2}$ starts to scan over an audio track $T_{A1}$ which has been just been formed by the head $H_{A1}$ and is recorded with the FM audio signal. This audio track $T_{A1}$ has a track width of 27 microns. As a result, the video track $T_{S1}$ is formed over the audio track $T_{A1}$. Since the frequency of the FM audio signal is relatively low, the FM audio signal is recorded on the audio track $T_{A1}$ down to a deep portion of a magnetic layer of the magnetic tape. On the other hand, the frequency of the FM luminance signal in the frequency division multiplexed signal is high and the frequency converted carrier chrominance signal in the frequency division multiplexed signal is low. However, since a non-saturated recording is carried out, the frequency division multiplexed signal of the FM luminance signal and the carrier chrominance signal is recorded on the video track $T_{S1}$ in only a surface portion of the magnetic layer of the magnetic tape. For this reason, the video track $T_{S1}$ and the audio track $T_{A1}$ can coexist in the same part of the magnetic tape.

The head $H_{A2}$ starts to form an audio track $T_{A2}$ from a time when the head $H_{S2}$ has rotated 105°. In addition, the head $H_{M1}$ starts to record the frequency division multiplexed signal amounting to the next field on a video track $T_{S2}$ from a time when the head $H_{S2}$ has rotated 180°. The head $H_{M1}$ forms the video track $T_{S2}$ having a track width of 29 microns over the audio track $T_{A2}$. Similarly thereafter, the video track recorded with the frequency division multiplexed signal and the audio track recorded with the FM audio signal are successively formed by the heads $H_{M1}$, $H_{S2}$, $H_{A1}$ and $H_{A2}$ with the track pitch of 58 microns.

FIG. 10B shows a track pattern formed in the extended (long-time) mode. A magnetic tape 31 is transported at such a low predetermined speed that the track pitch becomes 19.3 microns. The frequency division multiplexed signal is recorded on a video track $T_{L1}$ by the head $H_{S2}$ and is thereafter recorded on a next video track $T_{L2}$ by the head $H_{M1}$. The width of the head $H_{S2}$ is 29 microns, but the track pitch is 19.3 microns. Thus, even though the video track $T_{L1}$ having the track width of 29 microns is formed, an upstream side portion of the video track $T_{L1}$, which portion has a width of 9.7 (=29−19.3) microns, is erased by the formation of the next video track $T_{L2}$. As a result, the video tracks which have the track width of 19.3 microns and are recorded with the frequency division multiplexed signal are successively formed without a guard band.

The video track $T_{L1}$ is formed over an audio track $T_{A10}$ which has a track width of 19.3 microns and has been previously formed by the head $H_{A2}$ which leads the head $H_{S2}$ by 255° along the rotating direction of the rotary body. The audio track $T_{A10}$ is formed in the deep portion of the magnetic layer of the magnetic tape while the video track $T_{L1}$ is formed over the audio track $T_{A10}$ in the surface portion of the magnetic layer of the magnetic tape. Similarly, the video track $T_{L2}$ is formed over an audio track $T_{A11}$ which has been previously formed by the head $H_{A1}$ which leads the head $H_{M1}$ by 255° along the rotating direction of the rotary body, and the audio track $T_{A11}$ is formed in the deep portion of the magnetic layer of the magnetic tape while the video track $T_{L2}$ is formed over the audio track $T_{A11}$ in the surface portion of the magnetic layer of the magnetic tape.

Figure 12:
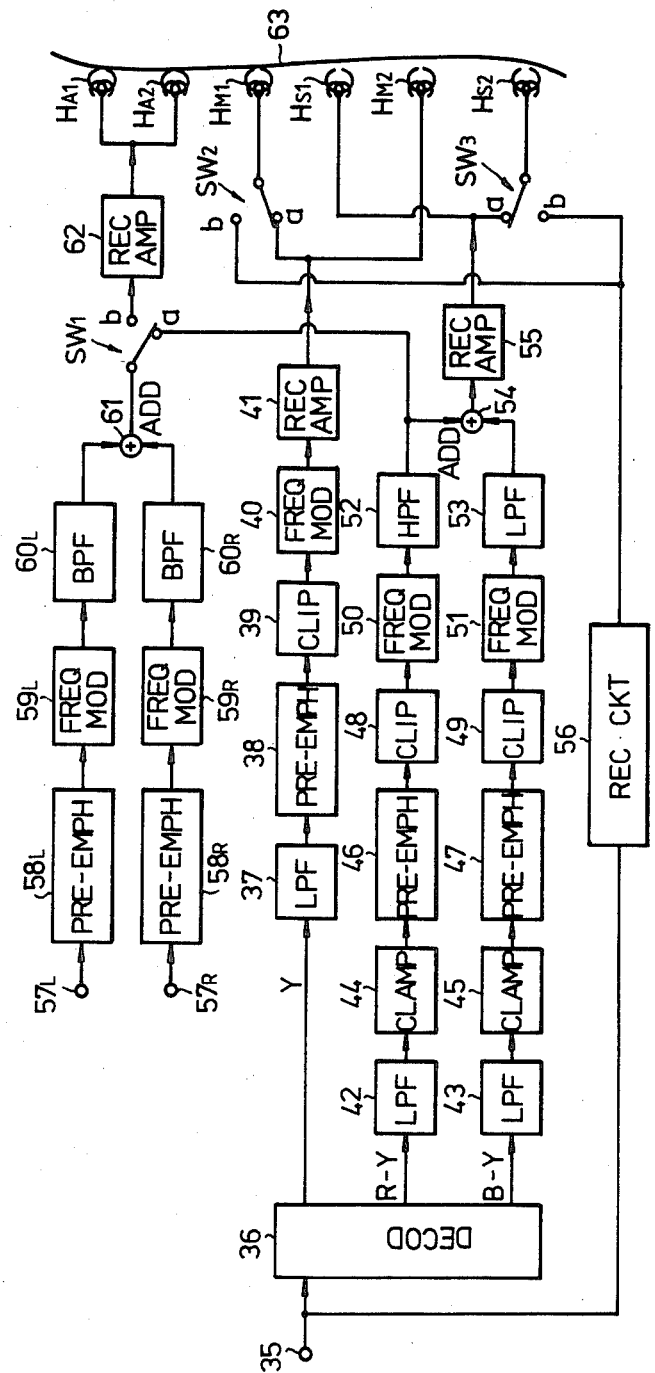
FIG. 12 is a system block diagram showing a first embodiment of the magnetic recording apparatus according to the present invention.

Next, description will be given with respect to a first embodiment of the signal processing system of the magnetic recording apparatus according to the present invention, by referring to FIG. 12. In FIG. 12, switches SW1, SW2 and SW3 are connected to respective contacts a when carrying out the recording on a magnetic tape 63 in the first recording mode in which the recording is carried out based on the Y/C separation recording and reproducing system as described before in conjunction with FIG. 4. The switches SW1, SW2 and SW3 are connected to respective contacts b when carrying out the recording on the tape 63 in the second recording mode in which the recording is carried out based on the low band conversion color recording system as described before in conjunction with FIGS. 10A and 10B. Carrier frequencies of frequency modulators 59L and 59R and pass characteristics of bandpass filters 60L and 60R which will be described later are changed depending on the connections of the switches SW1, SW2 and SW3.

First, description will be given with respect to the recording operation carried out in the first recording mode. In FIG. 12, an input composite color video signal applied to an input terminal 35 is supplied to a decoder 36. The decoder 36 performs frequency selection, demodulation and the like to obtain a luminance signal Y and two kinds of color difference signals R−Y and B−Y from the input composite color video signal. The frequency band of the luminance signal Y is wider than the frequency band of the luminance signal recorded according to the low band conversion color recording system. The luminance signal Y is supplied to a frequency modulator 40 via a lowpass filter 37, a pre-emphasis circuit 38 and a white/dark clipping circuit 39. The frequency modulator 40 produces an FM luminance signal having a carrier deviation band of 5 MHz to 6 MHz. The FM luminance signal is passed through a recording amplifier 41 and is supplied to the contact a of the switch SW2 and to the head $H_{M2}$. Unlike in the case of the conventional low band conversion color recording and reproducing system, there is no need to provide a highpass filter on the output side of the frequency modulator 40. This is because only the FM luminance signal is recorded on one track.

On the other hand, the color difference signal R−Y is supplied to a frequency modulator 50 via a lowpass filter 42, a clamping circuit 44, a pre-emphasis circuit 46 and a white/dark clipping circuit 48. Similarly, the color difference signal B−Y is supplied to a frequency modulator 51 via a lowpass filter 43, a clamping circuit 45, a pre-emphasis circuit 47 and a white/dark clipping circuit 49. Hence, a first FM color difference signal is obtained from the frequency modulator 50, and a second FM color difference signal is obtained from the frequency modulator 51. The first FM color difference signal is supplied to an adder 54 via a highpass filter 52, and the second FM color difference signal is supplied to the adder 54 via a lowpass filter 53. A second frequency division multiplexed signal from the adder 54, which will be described later, is passed through a recording amplifier 55 and is supplied to the contact a of the switch SW3 and to the head $H_{S1}$.

The input composite color video signal is also supplied to a recording circuit 56 which is known. The input composite color video signal is subjected to a known signal processing in accordance with the low band conversion color recording and reproducing system in the recording circuit 56 and is converted into a third frequency division multiplexed signal comprising an FM luminance signal and a frequency converted carrier chrominance signal which has been frequency-converted into a frequency band lower than a frequency band of the FM luminance signal. The third frequency division multiplexed signal from the recording circuit 56 is supplied to the contacts b of the switches SW2 and SW3.

A left-channel audio signal applied to an input terminal 57L is supplied to an adder 61 via a pre-emphasis circuit 58L, the frequency modulator 59L, and the bandpass filter 60L. Similarly, a right-channel audio signal applied to an input terminal 57R is supplied to the adder via a pre-emphasis circuit 58R, the frequency modulator 59R, and the bandpass filter 60R. An FM left-channel audio signal and an FM right-channel audio signal supplied to the adder 61 are frequency-division-multiplexed into a first frequency division multiplexed signal in the adder 61. The first frequency division multiplexed signal is supplied to a common contact of the switch SW1.

As described before, the switches SW1 through SW3 are connected to the respective contacts a. Hence, the first frequency division multiplexed signal is supplied to the adder 54 via the switch SW1 and is frequency-division-multiplexed with the first and second FM color difference signals, and the second frequency division multiplexed signal is obtained from the adder 54. The second frequency division multiplexed signal is passed through the recording amplifier 55 and a rotary transformer (not shown) and is supplied to the head $H_{S1}$. The second frequency division multiplexed signal is also supplied to the head $H_{S2}$ via the recording amplifier 55, the switch SW3 and a rotary transformer (not shown). The FM luminance signal obtained from the recording amplifier 41 is supplied to the head $H_{M2}$ via a rotary transformer (not shown). The FM luminance signal is also supplied to the head $H_{M1}$ via the switch SW2 and a rotary transformer (not shown).

Figure 13A:
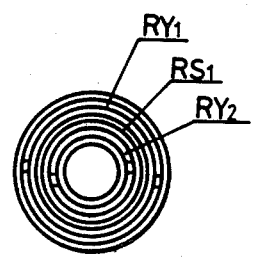
FIGS. 13A through 13C are diagrams for explaining a first embodiment of rotary transformers used in the present invention.
Figure 13B:
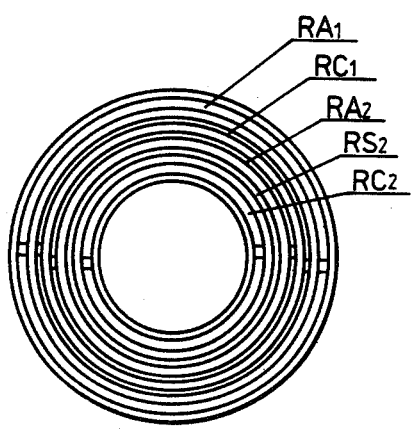
Figure 13C:
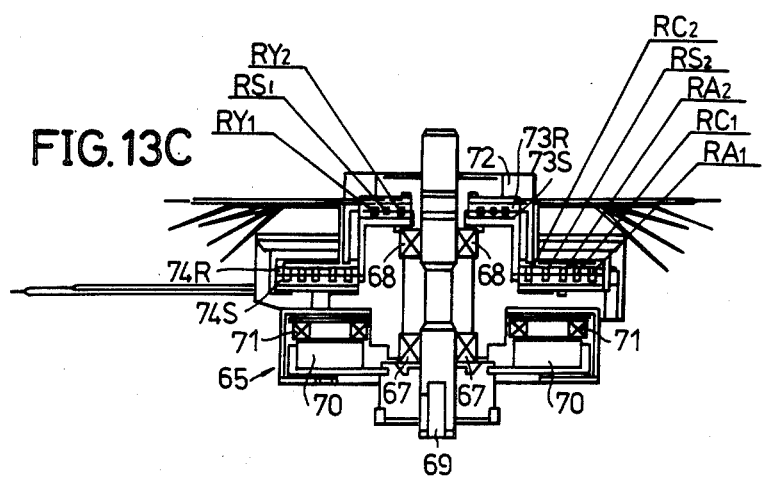
Figure 14A:
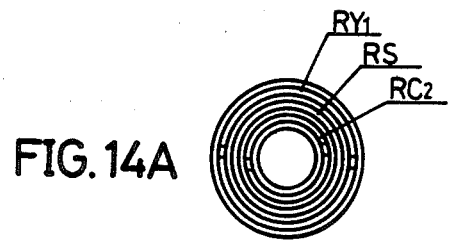
FIGS. 14A through 14C are diagrams for explaining a second embodiment of the rotary transformers used in the present invention.
Figure 14B:
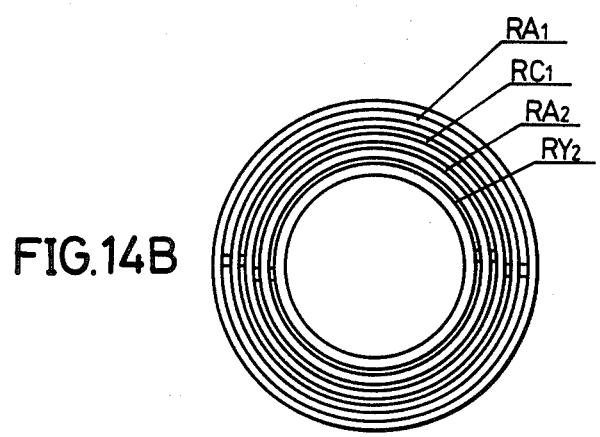
Figure 14C:
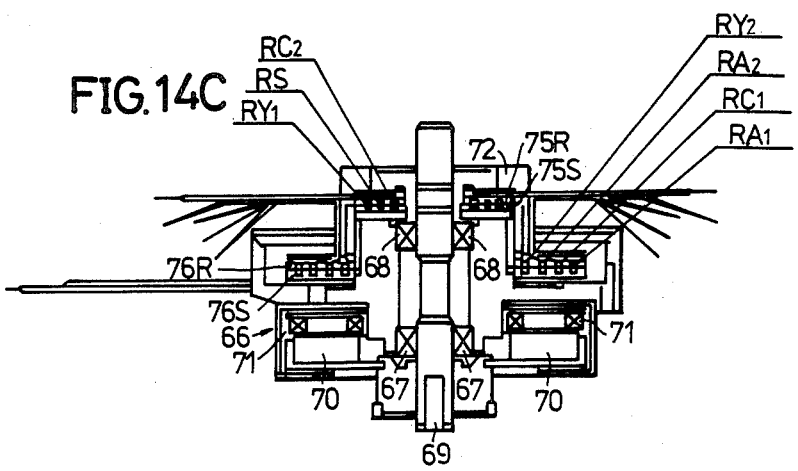

Next, description will be given with respect to the assignment of the channels to the respective rotary transformers. FIGS. 13A through 13C show a first embodiment of the construction of the rotary transformers and the like, and FIGS. 14A through 14C show a second embodiment of the construction of the rotary transformers and the like. FIGS. 13C and 14C respectively show lower stationary drum assemblies 65 and 66 each comprising two rotary transformer parts. In FIG. 13C, a motor shaft 69 is supported by bearings 67 and 68. A tip end of the motor shaft 69 is positioned at an upper end of the lower stationary drum assembly 65 and is fixed to a central part of a rotational plane of an upper rotary drum (not shown) which is mounted with the heads $H_{M1}$, $H_{M2}$, $H_{S1}$ and $H_{S2}$. The motor shaft 69 is rotated by a motor which comprises a rotor 70 and a stator 71, and thus, the upper rotary drum, a flywheel 72 and rotary cores 73R and 74R rotate unitarily. The rotary cores 73R and 74R each have a disc shape and are arranged at positions separated from and confronting respective stationary cores 73S and 74S each having a disc shape. The rotary core 73R and the stationary core 73S constituting a first rotary transformer part are located at positions above the rotary core 74R and the stationary core 74S constituting a second rotary transformer part. As shown in FIG. 13A, three concentric grooves are formed on a plane where the rotary core 73R and the stationary core 73S confront each other. Out of the three grooves, a short-circuiting ring RS1 is embedded in a center groove, a ring-shaped coil RY1 is embedded in an outer groove and a ring-shaped coil RY2 is embedded in an inner groove.

On the other hand, as shown in FIG. 13B, five concentric grooves are formed on a plane where the rotary core 74R and a stationary core 74S confront each other. Out of the five grooves, a ring-shaped coil RA1 is embedded in an outermost groove, and ring-shaped coils RC1 and RA2, a short-circuiting ring RS2 and a ring-shaped coil RC2 are embedded in the four remaining grooves from the second outermost groove to the innermost groove. Each of the ring-shaped coils RY1 and RY2 of the rotary core 73R have one end thereof coupled to the respective heads $H_{M1}$ and $H_{M2}$. Each of the ring-shaped coils RA1 and RA2 of the rotary core 74R have one end thereof coupled to the respective heads $H_{A1}$ and $H_{A2}$, and each of the ring-shaped coils RC1 and RC2 of the rotary core 74R have one end thereof coupled to the respective heads $H_{S1}$ and $H_{S2}$. The heads $H_{M1}$ and $H_{M2}$ are supplied with the FM luminance signal, but the heads $H_{S1}$ and $H_{S2}$ are supplied with the FM color difference signals which are different kinds of information signals compared to the FM luminance signal. Hence, in order to reduce the crosstalk, the heads $H_{S1}$ and $H_{S2}$ are coupled to the respective ring-shaped coils RC1 and RC2 of the rotary core 74R. In addition, the crosstalk between the heads $H_{M1}$ and $H_{M2}$ can be reduced by the short-circuiting ring RS1, and the crosstalk between the heads $H_{S1}$ and $H_{S2}$ can be reduced by the shortcircuiting ring RS2.

In the second embodiment shown in FIGS. 14A through 14C, a rotary core 75R and a stationary core 75S which constitute a first rotary transformer part are located at positions separated from and confronting each other, above the lower stationary drum assembly 66. As shown in FIG. 14A, three concentric grooves are formed on a plane where the rotary core 75R and stationary core 75S confront each other. Out of the three grooves, a short-circuiting ring RS is embedded in a center groove, a ring-shaped coil RY1 is embedded in an outer groove and a ring-shaped coil RC1 is embedded in an inner groove. In FIGS. 14A through 14C, those parts which are the same as those corresponding parts in FIGS. 13A through 13C are designated by the same reference numerals, and description thereof will be omitted. A rotary core 76R and a stationary core 76S which constitute a second rotary transformer part are arranged at positions separated from and confronting each other. Four concentric grooves are formed on a plane where the rotary core 76R and the stationary core 76S confront each other. Out of the four grooves, ring-shaped coils RA1, RC1, RA2 and RY2 are embedded from the outermost groove to the innermost groove. In the present embodiment, the ring-shaped coils coupled to the heads which are used simultaneously are separated by the short-circuiting ring RS or by the short-circuited ring-shaped coil RA2, and it is thus possible to reduce the crosstalk between the heads.

It is possible to obtain effects similar to those obtained when the short-circuiting ring is used by short-circuiting the ring-shaped coil which is not in use. Furthermore, in FIGS. 13A through 13C and FIGS. 14A through 14C, the positions of the ring-shaped coils may be re-arranged as long as the short-circuiting ring or the short-circuited ring-shaped coil which is not in use separates the coils which are in use.

Figure 15:
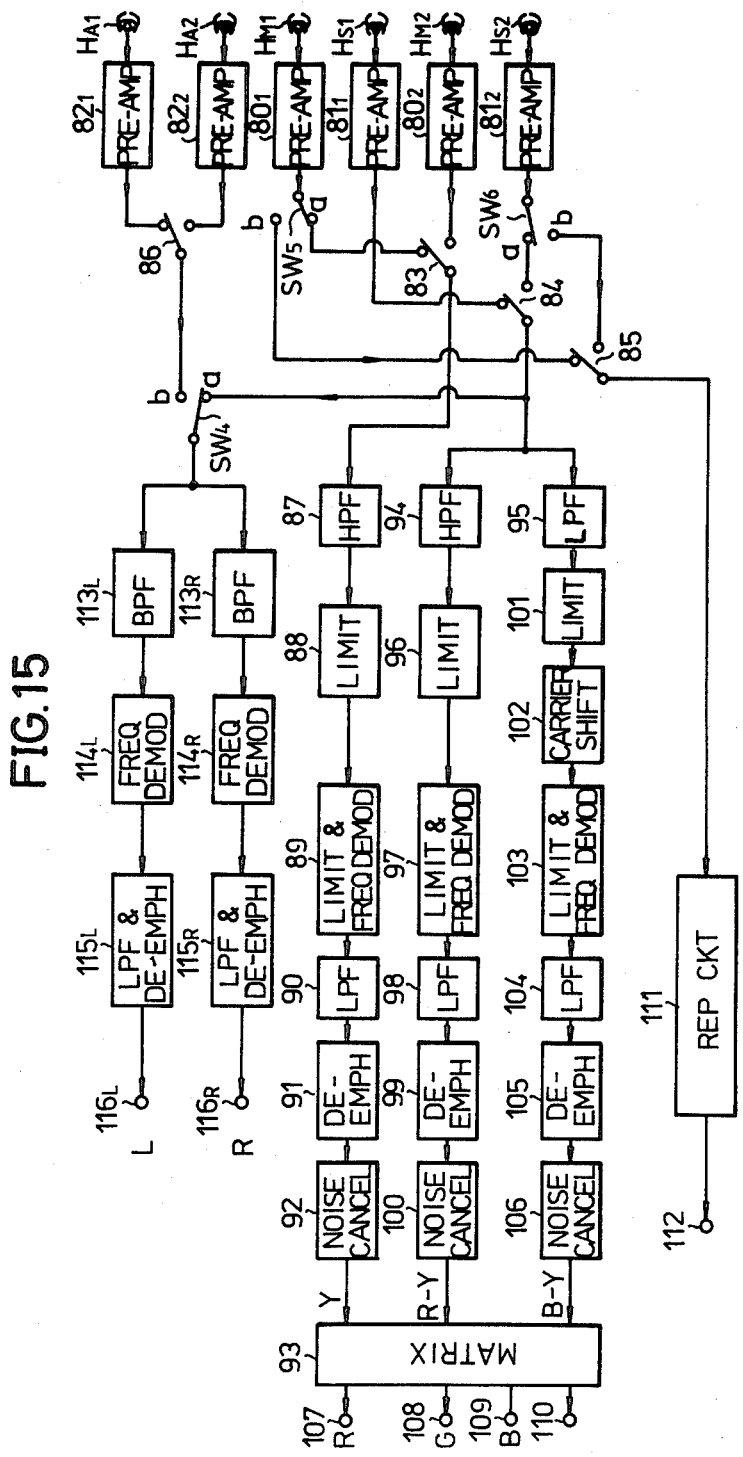
FIG. 15 is a system block diagram showing an example of a magnetic reproducing apparatus for playing a magnetic tape which has a track pattern formed by the magnetic recording apparatus according to the present invention.

Next, description will be given with respect to an example of a reproducing system for reproducing the information signal recorded by the magnetic recording apparatus according to the present invention, by referring to FIG. 15. In FIG. 15, those parts which are the same as those corresponding parts in FIG. 5 are designated by the same reference numerals, and description thereof will be omitted. In the case where the heads $H_{M1}$, $H_{M2}$, $H_{S1}$ and $H_{S2}$ are respectively replaced by the heads $H_{Y1}$, $H_{Y2}$, $H_{C1}$ and $H_{C2}$ shown in FIG. 2, it is possible to reproduce the recorded information signal from the magnetic tape having the track pattern shown in FIG. 1.

In FIG. 15, switches SW4, SW5 and SW6 are connected to respective contacts a in a first reproducing mode in which the reproduction is carried out with respect to the magnetic tape recorded in the first recording mode described before. On the other hand, the switches SW4 through SW6 are connected to respective terminals b in a second reproducing mode in which the reproduction is carried out with respect to a magnetic tape recorded in the second recording mode described before. First, description will be given with respect to the reproducing operation in the first reproducing mode. In the first reproducing mode, the magnetic tape is transported at a predetermined speed which is identical to that at the time of the recording carried out in the first recording mode.

In FIG. 15, during a certain one field period, a reproduced FM luminance signal obtained by scanning the track $T_{Y1}$ by the head $H_{M1}$ is supplied to a switch 83 via a pre-amplifier $80_1$ and the switch SW5. During the next one field period, a reproduced FM luminance signal obtained by scanning the track $T_{Y2}$ by the head $H_{M2}$ is supplied to the switch 83 via a pre-amplifier $80_2$. Similarly thereafter, the FM luminance signal is alternately reproduced by the heads $H_{M1}$ and $H_{M2}$ for every one field.

The switch 83 alternately passes the reproduced FM luminance signals from the pre-amplifiers $80_1$ and $80_2$ selectively, and the reproduced FM luminance signal from the switch 83 is supplied to a second limiter and frequency demodulator 89 via a highpass filter 87 and a first limiter 88. It is possible to omit the highpass filter 87. A reproduced luminance signal having a wide frequency band is obtained from the second limiter and frequency demodulator 89, and is supplied to a matrix circuit 93 which will be described later via a lowpass filter 90, a de-emphasis circuit 91 and a noise cancelling circuit 92.

Reproduced second frequency division multiplexed signals which are alternately obtained from the heads $H_{S1}$ and $H_{S2}$ for every one field are supplied to respective pre-amplifiers $81_1$ and $81_2$ via rotary transformers (not shown). The output signals of the pre-amplifier $81_1$ is supplied to a switch 84 which is switched over for every one field, and the output signal of the pre-amplifier $81_2$ is supplied to the switch 84 via the switch SW6. The reproduced signal obtained from the switch 84 is supplied to a highpass filter 94 and a lowpass filter 95. A reproduced first FM color difference signal separated in the highpass filter 94 is passed through a first limiter 96 and a second limiter and frequency demodulator 97 and is demodulated into a reproduced color difference signal R-Y. A lowpass filter 98 eliminates the carrier from the reproduced color difference signal R-Y, and an output signal of the lowpass filter 98 is supplied to a de-emphasis circuit 99 which carries out a de-emphasis complementary to the pre-emphasis carried out in the pre-emphasis circuit 46, by attenuating the high frequency components. An output signal of the de-emphasis circuit 99 is passed through a noise cancelling circuit 100 which cancels noise by use of the correlation in the horizontal scanning lines, and is supplied to the matrix circuit 93.

On the other hand, a reproduced second FM color difference signal separated in the lowpass filter 95 is passed through a first limiter 101 wherein the level deviation is eliminated and is supplied to a carrier shifter 102 which frequency-converts the reproduced second FM color difference signal (that is, shifts the carrier) so that the frequency band thereof does not overlap a frequency band of a demodulated signal that is obtained by demodulating the reproduced second FM color difference signal. An output signal of the carrier shifter 102 is passed through a second limiter and frequency demodulator 103 and is demodulated into a reproduced color difference signal B-Y. The reproduced color difference signal B-Y is supplied to the matrix circuit 93 via a lowpass filter 104, a de-emphasis circuit 105 and a noise cancelling circuit 106.

The matrix circuit 93 performs a matrix operation and produces primary color signals of red (R), green (G) and blue (B) from the reproduced luminance signal and the two kinds of color difference signals R-Y and B-Y. The red, green and blue primary color signals are outputted via respective output terminals 107, 108 and 109. The matrix circuit 93 also produces a composite synchronizing signal, and this composite synchronizing signal is outputted via an output terminal 110. A difference in the recording timings of the luminance signal and the color difference signals is a tolerable difference within the vertical blanking period, and it is possible to match the timings of the reproduced luminance signal and the reproduced color difference signals by appropriately changing the head switching timing within this period.

When playing the magnetic tape 30 having the track pattern shown in FIG. 10A, the tape 30 is transported at a speed which is identical to that at the time of the recording. In addition, the switches SW4 through SW6 are connected to the respective contacts b as described before. Reproduced third frequency division multiplexed signals obtained by scanning the tracks $T_{S1}$, $T_{S2}$ and the like by the heads $H_{M1}$ and $H_{S2}$ are passed through the respective pre-amplifiers $80_1$ and $81_2$ and the respective switches SW5 and SW6 and are supplied to a switch 85 which is switched over for every one field. The reproduced third frequency division multiplexed signal obtained from the switch 85 is supplied to a reproducing circuit 111 which is known. The reproduced third frequency division multiplexed signal comprises a reproduced FM luminance signal and a reproduced frequency converted carrier chrominance signal, and the reproducing circuit 111 converts the reproduced third frequency division multiplexed signal into a reproduced color video signal by known signal processing means. The reproduced color video signal is outputted via an output terminal 112.

On the other hand, reproduced first frequency division multiplexed signals obtained by scanning the tracks $T_{A1}$, $T_{A2}$ and the like by the heads $H_{A1}$ and $H_{A2}$ are passed through respective rotary transformers (not shown) and respective pre-amplifiers $82_1$ and $82_2$ and are supplied to a switch 86 which is switched over for every one field. The reproduced first frequency division multiplexed signal from the switch 86 is supplied to bandpass filters 113L and 113R via the switch SW4. A reproduced first FM audio signal obtained from the bandpass filter 113L is frequency-demodulated in a frequency demodulator 114L and is supplied to a lowpass filter and de-emphasis circuit 115L. Similarly, a reproduced second FM audio signal obtained from the bandpass filter 113R is frequency-demodulated in a frequency demodulator 114R and is supplied to a lowpass filter and de-emphasis circuit 115R. An output signal of the lowpass filter and de-emphasis circuit 115L is outputted via an output terminal 116L as a reproduced left-channel audio signal, and an output signal of the lowpass filter and de-emphasis circuit 115R is outputted via an output terminal 116R as a reproduced right-channel audio signal. The reproduction in the standard mode is carried out in this manner.

Next, when playing the magnetic tape 31 having the track pattern shown in FIG. 10B, the tape 31 is transported at a low speed identical to that at the time of the recording. The switches SW4 through SW6 are connected to the respective contacts b as described before. Reproduced signals are obtained by scanning the tracks $T_{L1}$, $T_{L2}$ and the like by the lower heads $H_{M1}$ and $H_{S2}$ which are used in the standard mode. The reproduced signals are passed through the respective pre-amplifiers $80_1$ and $81_2$ and the respective switches SW5 and SW6 and are supplied to the switch 85. The reproduced signal from the switch 85 is supplied to the reproducing circuit 111 and is subjected to the signal processing described before, and the reproduced color video signal is outputted via the output terminal 112. The reproduced first frequency division multiplexed signals described before are obtained from the heads $H_{A1}$ and $H_{A2}$ and are subjected to the separation (filtering) and demodulation similar to those described for the reproduction in the standard mode. Hence, the reproduced left-channel and right-channel audio signals are outputted via the output terminals 116L and 116R.

Figure 16:
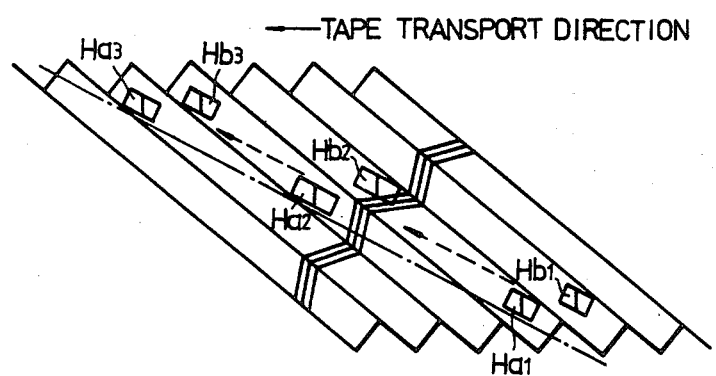
FIG. 16 shows an example of head scanning loci during a special reproduction mode.

The magnetic tape recorded in the standard and extended modes described before and the magnetic tape recorded on the existing VTR for home use can be played by use of the heads having the arrangement shown in FIG. 2 and the like. In this case, during a still picture reproduction and a high speed search, the heads $H_{S1}$ and $H_{M1}$ or the heads $H_{M2}$ and $H_{S2}$ scan over scanning loci indicated by $H_{a1}$, $H_{b1} \rightarrow H_{a2}$, $H_{b2} \rightarrow H_{a3}$, $H_{b3}$ in FIG. 16. The heads $H_{S1}$ and $H_{M1}$ or the heads $H_{M2}$ and $H_{S2}$ scan over two mutually adjacent tracks, and a reproduced signal having very little noise can be obtained by selectively obtaining the reproduced signal from one of the two heads outputting the higher reproduced output level. When the distance c between the two heads is not an integral multiple of the horizontal scanning period, it is possible to prevent the unstableness of the reproduced picture during the special reproduction by delaying one of the reproduced signals from the two heads.

In each of the embodiments described heretofore, the two parallel tracks which are formed simultaneously are formed in a region on the outer side (that is, downstream side of the magnetic tape) of the two parallel tracks which have been formed immediately before. However, as will be described hereunder, the present invention is not limited to the embodiments described heretofore, and it is possible to form the two parallel tracks so that one of the two parallel tracks is formed between a guard band formed between the two parallel tracks formed immediately before.

Figure 17:
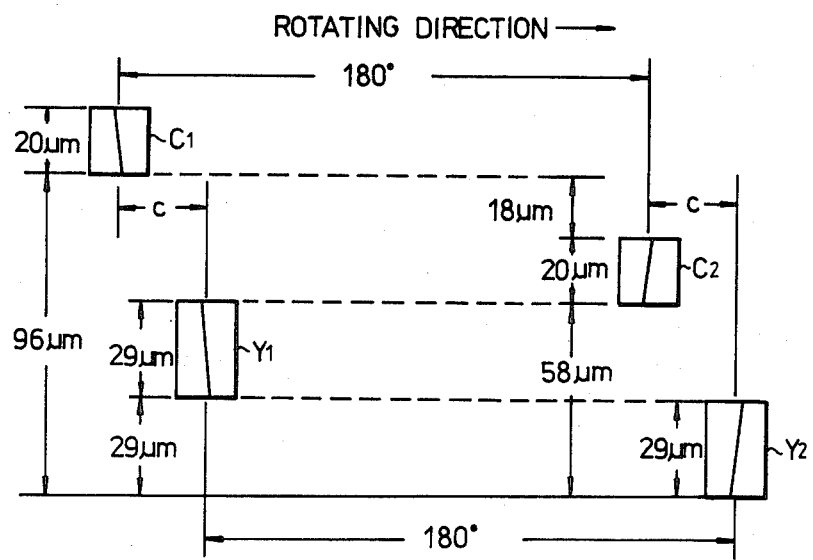
FIG. 17 shows a third embodiment of the arrangement of the rotary magnetic heads in the magnetic recording apparatus according to the present invention.

In FIG. 17, first and second rotary magnetic heads Y1 and Y2 are mounted on the rotary body at mutually opposing positions having an angular separation of 180° on the rotational plane of the rotary body. Third and fourth rotary magnetic heads C1 and C2 are mounted on the rotary body at mutually opposing positions having an angular separation of 180° on the rotational plane of the rotary body. The heads Y1 and Y2 are mounted at such positions on the rotational plane of the rotary body that the heads Y1 and Y2 respectively lead the heads C1 and C2 by a distance c in a rotating direction of the rotary body. In addition, the heads Y1, Y2, C1 and C2 are mounted at such height positions on the rotary body that a lower end of the head Y1 is 29 microns higher than a lower end of the head Y2 which is mounted at a lowermost position, a lower end of the head C2 is 58 microns higher than the lower end of the head Y2, and a lower end of the head C1 is 96 microns higher than the lower end of the head Y2.

In other words, the four heads Y1, Y2, C1 and C2 are mounted at mutually different height positions so that the head Y2 has the lowest height position, the head Y1 has the second lowest height position, the head C2 has the third lowest height position, and the head C1 has the highest height position. The heads Y1 and Y2 for recording the FM luminance signal having the wide frequency band have a track width of 29 microns, and the heads C1 and C2 for recording the two kinds of FM color difference signals have a track width of 20 microns which is smaller compared to the track width of the heads Y1 and Y2. There is a distance of 18 (=38−20) microns between an upper end of the head C2 and the lower end of the head C1. There is a distance of 116 (=29×4) microns between an upper end of the head C1 and the lower end of the head Y2.

The heads Y1, Y2, C1 and C2 have gaps of azimuth angles identical to the standardized azimuth angles of gaps of the rotary magnetic heads used in the existing VTR employing the low band conversion color recording and reproducing system. For example, the heads C2 and Y2 each have a gap of an azimuth angle of +6°, and the heads C1 and Y1 each have a gap of an azimuth angle of −6°.

Rotary magnetic heads A1 and A2 exclusively for recording audio signals are also mounted on the rotary body similarly to the heads $H_{A1}$ and $H_{A2}$ of the embodiment shown in FIG. 5, but the illustration of the heads A1 and A2 will be omitted in FIG. 17 for convenience' sake.

Figure 18:
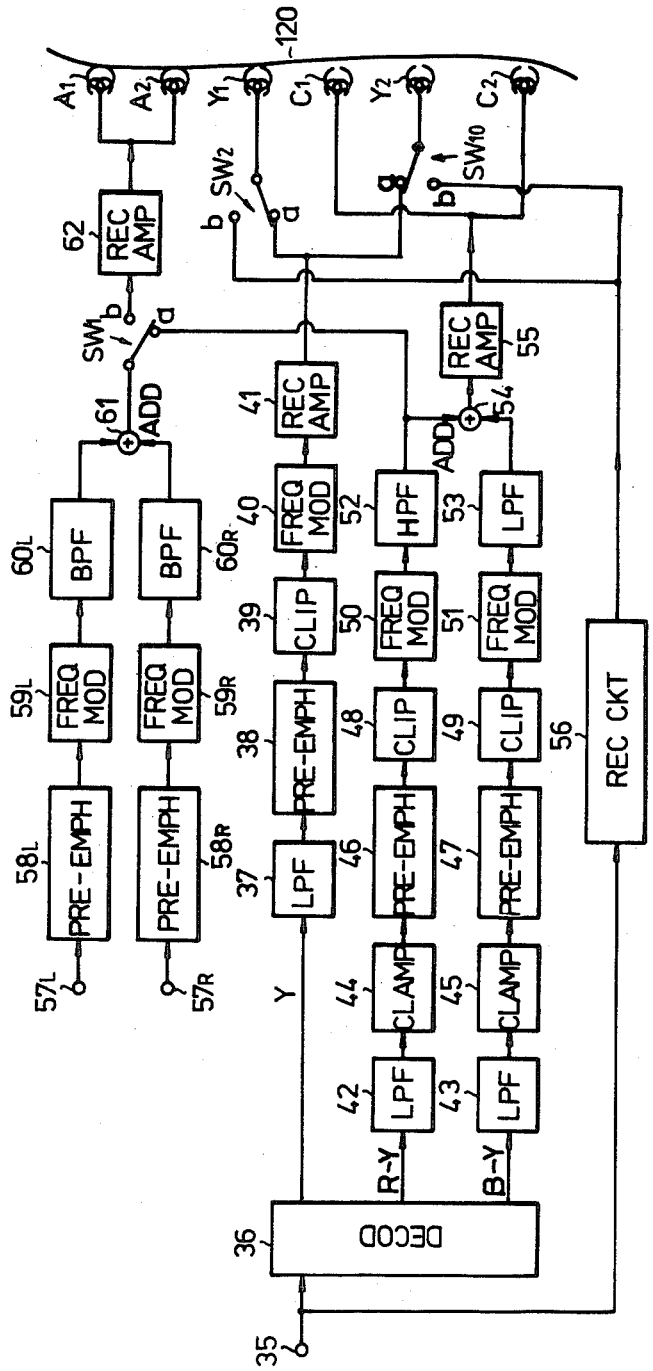
FIG. 18 is a system block diagram showing a second embodiment of the magnetic recording apparatus according to the present invention.

The four heads shown in FIG. 17 are supplied with the video signal which is to be recorded by a magnetic recording apparatus shown in FIG. 18. In FIG. 18, those parts which are the same as those corresponding parts in FIG. 12 are designated by the same reference numerals, and description thereof will be omitted. In FIG. 18, a switch SW10 is provided instead of the switch SW3 shown in FIG. 12. The switch SW10 supplies to the head Y2 an FM luminance signal which has a frequency spectrum shown in FIG. 19(A) and is obtained from the recording amplifier 41 in the first recording mode. On the other hand, the switch SW10 supplies to the head Y2 the third frequency division multiplexed signal from the recording circuit 56 in the second recording mode. The heads C1 and C2 are supplied with the second frequency division multiplexed signal from the recording amplifier 55 in the first recording mode. Hence, in the first recording mode, the heads C1 and C2 record the second frequency division multiplexed signal which comprises the two kinds of FM color difference signals and has a frequency spectrum shown in FIG. 19(B).

Figure 20:
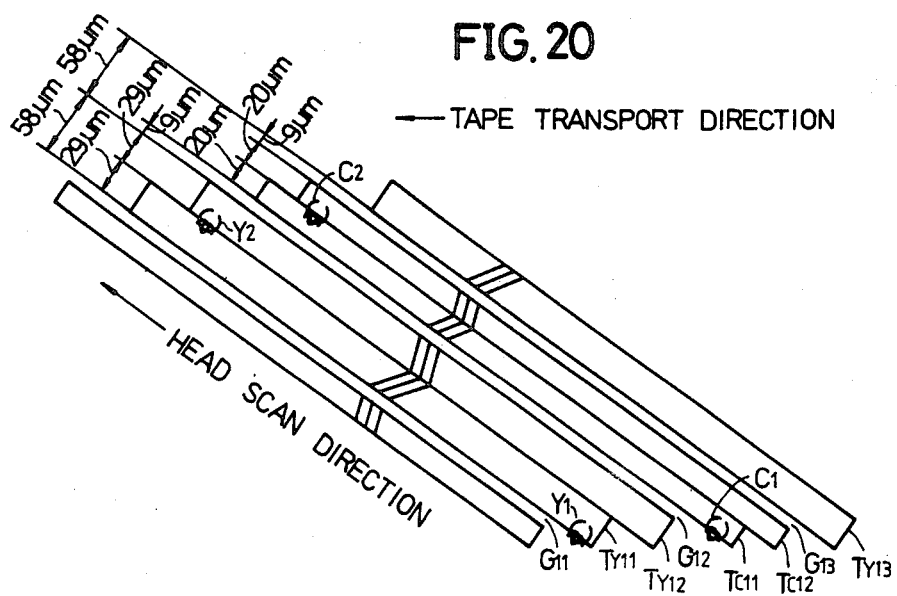
FIG. 20 shows an embodiment of the track pattern formed on the magnetic tape by the rotary magnetic heads shown in FIG. 17.

Accordingly, a track pattern shown in FIG. 20 is formed on a magnetic tape 120. In FIG. 20, the illustration of the two audio tracks formed at the upper portion of the tape 120 along the longitudinal direction thereof and the control track which is formed at the lower portion of the tape 120 along the longitudinal direction thereof and is recorded with control pulses having a constant period (for example, one frame) will be omitted for convenience' sake. Tracks $T_{Y11}$, $T_{Y12}$ and $T_{Y13}$ formed obliquely to the longitudinal direction of the tape 120 have a track width of 29 microns and are respectively recorded with an FM luminance signal amounting to one field (actually, including in addition an overlap recording period) as a first information signal. Tracks $T_{C11}$, $T_{C12}$ and $T_{C13}$ formed obliquely to the longitudinal direction of the tape 120 have a track width of 20 microns and are respectively recorded with the second frequency division multiplexed signal amounting to one field (actually, including in addition an overlap recording period) as a second information signal. In addition, guard bands G11 through G13 having a width of 9 microns are respectively formed between two mutually adjacent tracks recorded with different kinds of information signals.

When it is assumed that the magnetic tape is transported at a rate of 58 microns in one-half revolution (one field) of the rotary body, the track $T_{Y11}$ shown in FIG. 20 is formed by the head Y1 during a certain one field is formed by the head Y1 during a certain one field period, and at the same time, the track $T_{C11}$ is formed by the head C1 with a guard band having a pattern interval of 38 microns which corresponds to approximately one field of the luminance signal recording track. During the next one field period, the track $T_{Y12}$ is formed by the head Y2 without a guard band, so that the lower end of the head Y2 which is mounted at the position 29 microns lower than the head Y1 as shown in FIG. 17 coincides with the upper end of the track $T_{Y11}$. At the same time, the track $T_{C12}$ is formed by the head C2 with a guard band having a pattern interval of 29 microns which corresponds to approximately one field of the color difference signal recording track.

Accordingly, the head Y2 forms the track $T_{Y12}$ in the guard band region between the two parallel tracks $T_{Y11}$ and $T_{C11}$ which are formed immediately before. As a result, the guard band G12 having a width of 9 microns is formed between the tracks $T_{Y12}$ and $T_{C11}$. In addition, as shown in FIG. 20, the track $T_{C12}$ is formed without a guard band on the upstream side of the track $T_{C11}$. When the formation of the tracks $T_{Y12}$ and $T_{C12}$ is completed, the magnetic tape has advanced 58 microns from the time when the formation of the tracks $T_{Y12}$ and $T_{C12}$ is started. Further, since the head Y1 which records the FM luminance signal related to the next one field is mounted at a position 29 microns higher than the head Y2 as shown in FIG. 17, the track $T_{Y13}$ is formed on the upstream side of the track $T_{Y12}$ at a position 87 ($=58+29$) microns from the track $T_{Y12}$ which is formed by the head Y2 as shown in FIG. 20.

As a result, a guard band having a width of 9 microns is formed between the tracks $T_{Y13}$ and $T_{C12}$. As may be understood from the description given before, the FM luminance signal is recorded on a track (not shown) by the head C1 with a guard band having a width of 38 microns at the same time as the formation of the track $T_{Y13}$. The track pattern shown in FIG. 20 is formed in this manner.

When taking into consideration the compatibility of the magnetic tape between the magnetic recording apparatus according to the present invention and the existing VTR for home use employing the low band conversion color recording and reproducing system, the rotary body which is mounted with the heads Y1, Y2, C1 and C2 and is wrapped obliquely with the magnetic tape on the outer periphery thereof for a predetermined angular range greater than 180° must have a diameter identical to the standardized diameter of the rotary body used in the existing VTR for home use. In addition, the inclination angle of the scanning locus of the head in the still reproduction mode in which the magnetic tape is stopped from being transported must be identical to that of the existing VTR for home use.

Figure 19:
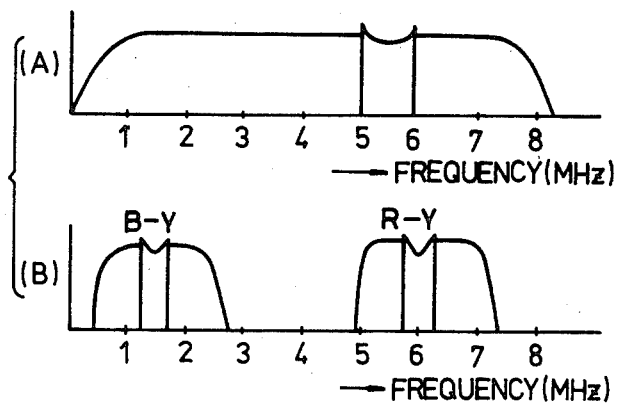
FIGS. 19(A) and 19(B) show frequency spectrums of signals at essential parts of the block system shown in FIG. 18.

According to the present embodiment, a wide guard band is formed between two mutually adjacent tracks recorded with different kinds of information signals, and in addition, these two mutually adjacent tracks are formed by the heads having gaps of mutually opposite azimuth angles. Moreover, since the carrier frequency of the color signal is selected to a frequency which is relatively high compared to the frequency (629 kHz) of the frequency converted carrier chrominance signal obtained in accordance with the low band conversion color recording and reproducing system as shown in FIG. 19(B), it is possible to more effectively prevent the crosstalk from the adjacent track.

On the other hand, no guard band or only an extremely narrow guard band is formed between the two mutually adjacent tracks recorded with the same kind of information signal. However, because these two mutually adjacent tracks are formed by the heads Y1 and Y2 or the heads C1 and C2 which have gaps of mutually different azimuth angles, virtually no crosstalk is generated from the adjacent track due to the azimuth loss effect. Even when the crosstalk is generated from the adjacent track, it is possible to effectively reduce the crosstalk because the recording is carried out with the H-alignment. Further, since the two mutually adjacent signals (luminance signals, color difference signals) recorded in the two mutually adjacent tracks have the field correlation and closely resemble each other, it is possible to carry out the crosstalk cancelling operation by use of the field correlation. Therefore, the crosstalk does not become a problem even without the use of the automatic scan tracking device.

In the case where the recording is to be carried out based on the Y/C separation recording and reproducing system described before, that is, in the first recording mode, the heads A1 and A2 shown in FIG. 18 are not used.

Next, description will be given for the case where the recording is carried out based on the low band conversion color recording system, that is, in the second recording mode. The recording is carried out by the heads Y1 and Y2 or the heads C1 and C2 while transporting the magnetic tape at a speed identical to that during the standard mode of the existing VTR for home use. The heads A1 and A2 are used in this case. It is possible to use either the upper heads C1 and C2 or the lower heads Y1 and Y2, but the lower heads Y1 and Y2 are used in the present embodiment for reasons similar to those described before in conjunction with the previous embodiments.

In FIG. 18, when carrying out the recording in the second recording mode, the switches SW1, SW2 and SW10 are connected to the respective contacts b as described before. At the same time, the recording amplifiers 41 and are made inactive so as to cut off the signal supply to the heads C1 and C2. The tape 120 is transported at a predetermined speed which is identical to that in the standard mode of the existing VTR for home use, that is, at such a speed that the tracks are formed with a track pitch of 58 microns. The third frequency division multiplexed signal obtained from the recording circuit 56 is supplied to the head Y1 via the switch SW2 on one hand, and the third frequency division multiplexed signal is supplied to the head Y2 via the switch SW10 on the other.

The first frequency division multiplexed signal comprising the first and second FM audio signals is obtained from the adder 61 and is supplied to the heads A1 and A2 via the switch SW1 and a recording amplifier 62.

Figure 21:
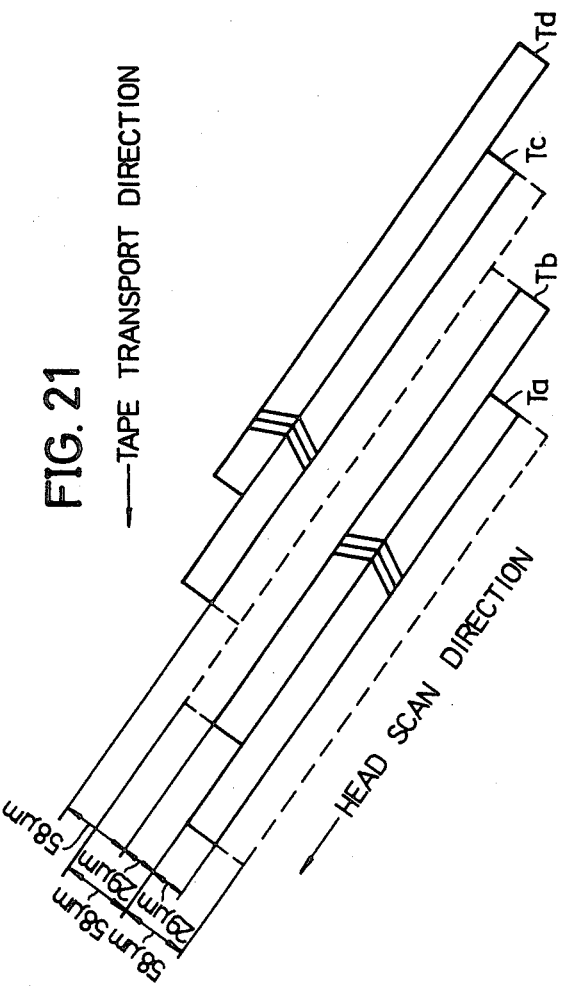
FIG. 21 shows another embodiment of the track pattern formed on the magnetic tape by the rotary magnetic heads shown in FIG. 17.

FIG. 21 shows a track pattern formed on the magnetic tape when the recording is carried out in the second recording mode. In FIG. 21, the illustration of the audio tracks and the control track is omitted for convenience' sake. The magnetic tape is transported at a predetermined speed so that the tracks are formed with a track pitch of 58 microns. The head Y1 starts to record the third frequency division multiplexed signal comprising the FM luminance signal and the frequency converted carrier chrominance signal on a video track Ta having a track width of 29 microns. At a time when the head Y1 has rotated an angle of 75°, for example, the head Y1 starts to scan over an audio track which has been just been formed by the head A1 and is recorded with the FM audio signal (first frequency division multiplexed signal). This audio track has a track width of 27 microns, for example. As a result, the video track Ta is formed over the audio track. Since the frequency of the FM audio signal is relatively low, the FM audio signal is recorded on the audio track down to a deep portion of a magnetic tape. On the other hand, the frequency of the FM luminance signal in the third frequency division multiplexed signal is high and the frequency converted carrier chrominance signal in the third frequency division multiplexed signal is low. However, since a non-saturated recording is carried out, the third frequency division multiplexed signal of the FM luminance signal and the carrier chrominance signal is recorded on the video track Ta in only a surface portion of the magnetic layer of the magnetic tape. For this reason, the video track Ta and the audio track can coexist in the same part of the magnetic tape.

The head A2 starts to form a next audio track from a time when the head Y1 has rotated 105°, for example. In addition, the head Y2 starts to record the third frequency division multiplexed signal amounting to the next field on a video track Tb from a time when the head Y1 has rotated 180°. The head Y2 forms the video track Tb having a track width of 29 microns over the audio track formed by the head A2. Similarly thereafter, video tracks Tc, Td and the like recorded with the third frequency division multiplexed signal and the audio tracks recorded with the FM audio signal are successively formed by the heads Y1, Y2, A1 and A2 with the track pitch of 58 microns and with a guard band having a width of 58 microns formed for every two video tracks.

The present invention is not limited to the embodiments described heretofore, and the first and second information signals which are recorded on the magnetic tape are not limited to those described. The description given heretofore is for the case where the first information signal is the luminance signal and the second information signal is the two kinds of color difference signals, but the first and second information signals may be selected from any of the following four combinations, for example. According to a first combination, the first information signal is a luminance signal, and the second information signal is a frequency division multiplexed signal comprising signals which are obtained by independently frequency-modulating two kinds of color difference signals and audio signals. According to a second combination, the first information signal is a luminance signal, and the second information signal is a frequency division multiplexed signal comprising signals which are obtained by independently frequency-modulating two kinds of color difference signals and signals obtained by subjecting audio signals to a pulse code modulation (PCM), a quaternary phase shift keying (QPSK) or quaternary differential phase shift keying (QDPSK). According to a third combination, the first information signal is a composite color video signal and the second information signal is audio signals. According to a fourth combination, the first information signal is a luminance signal and the second information signal is a frequency division multiplexed signal comprising a frequency modulated time base compressed line-sequential color difference signal and frequency modulated audio signals.

In addition, the positions of the heads $H_{M1}$ and $H_{M2}$ (or heads Y1 and Y2) and the heads $H_{S1}$ and $H_{S2}$ (or heads C1 and C2) may be interchanged, respectively. The track widths of the rotary magnetic heads are of course not limited to those of the embodiments.

Further, the present invention is not limited to these embodiments, but various variations and modifications may be made without departing from the scope of the present invention.

What is claimed is:

1. A magnetic recording apparatus for recording two kinds of mutually different information signals on independent tracks of a magnetic tape, said magnetic recording apparatus comprising:

first and second rotary magnetic heads mounted on a rotary body at mutually opposing positions on a rotational plane of said rotary body, said rotary body being wrapped obliquely with a magnetic tape on an outer peripheral surface thereof for a predetermined angular range;

third and fourth rotary magnetic heads mounted on said rotary body at mutually opposing positions respectively close to said first and second rotary magnetic heads on the rotational plane of said rotary body along a rotating direction of said rotary body, said third and fourth rotary magnetic heads having height positions along a rotary axis of said rotary body different from height positions of said first and second rotary magnetic heads; and recording means for repeating a sequence of recording operations in which first and second information signal recording tracks are independently but simultaneously formed on the magnetic tape by said first and third rotary magnetic heads with a constant width guard band formed between said first and second information signal recording tracks during a certain one track scanning period and said first and second information signal recording tracks are independently but simultaneously formed on the magnetic tape by said second and fourth rotary magnetic heads with a constant width guard band formed between said first and second information signal recording tracks during a one track scanning period next to said certain one track scanning period so that information signal recording tracks recorded with the same kind of information signal are formed adjacent to each other, an extremely narrow guard band or no guard band being formed between two adjacent first information signal recording tracks and between two adjacent second information signal recording tracks, a wide guard band being formed between first and second information signal recording tracks which are adjacent to each other.

2. A magnetic recording apparatus as claimed in claim 1 in which said first and second rotary magnetic heads have gaps of the same azimuth angle and have the same height position on said rotary body, said third and fourth rotary magnetic heads having gaps of the same azimuth angle which is different from that of said first and second rotary magnetic heads, said third and fourth rotary magnetic heads having the same height position on said rotary body different from that of said first and second rotary magnetic heads, said recording means supplying a first information signal to said first and fourth heads and supplying a second information signal to said second and third rotary magnetic heads so that the kinds of information signals independently but simultaneously recorded on two parallel tracks are interchanged for every one track scanning period.

3. A magnetic recording apparatus as claimed in claim 1 in which said first rotary magnetic head has a gap of a first azimuth angle and said second rotary magnetic head has a gap of a second azimuth angle, said first and second rotary magnetic heads having the same height position on said rotary body, said third rotary magnetic head having a gap of said first azimuth angle, said fourth rotary magnetic head having a gap of said second azimuth angle, said third and fourth rotary magnetic heads having the same height position on said rotary body different from that of said first and second rotary body different said recording means supplying a first information signal to said first and fourth rotary magnetic heads and supplying a second information signal to said second and third rotary magnetic heads so that the kinds of information signals independently but simultaneously recorded on two parallel tracks are interchanged for every one track scanning period.

4. A magnetic recording apparatus as claimed in claim 3 in which said rotary body has a diameter identical to a standardized diameter of a rotary body of an existing magnetic recording and/or reproducing apparatus employing a low band conversion color recording and reproducing system, said first and second azimuth angles being respectively identical to two kinds of standardized azimuth angles of rotary magnetic heads of said existing magnetic recording and/or reproducing apparatus, said first through fourth rotary magnetic heads having approximately the same track widths, said recording means comprising switching means, said switching means in a first recording mode setting a transporting speed of the magnetic tape to a transporting speed higher than a standardized transporting speed of said existing magnetic recording and/or reproducing apparatus and supplying said first information signal to said first and fourth rotary magnetic heads and supplying said second information signal to said second and third rotary magnetic heads, said switching means in a second recording mode setting the transporting speed of the magnetic tape to said standardized transporting speed of said existing magnetic recording and/or reproducing apparatus and supplying a third information signal to only one pair of rotary magnetic heads out of a pair constituted by said first and second rotary magnetic heads and a pair constituted by said third and fourth rotary magnetic heads.

5. A magnetic recording apparatus as claimed in claim 1 in which said first rotary magnetic head has a height position relatively lower than a height position of said third rotary magnetic head on said rotary body, said second rotary magnetic head having a height position relatively lower than a height position of said fourth rotary magnetic head on said rotary body, said first and second rotary magnetic heads being mounted on said rotary body at positions respectively leading said third and fourth rotary magnetic heads along the rotating direction of said rotary body.

6. A magnetic recording apparatus as claimed in claim 4 in which said first information signal is a frequency modulated luminance signal, said second information signal is a first frequency division multiplexed signal including at least two kinds of frequency modulated color difference signals, and said third information signal is a second frequency division multiplexed signal comprising a frequency modulated luminance signal and a frequency converted carrier chrominance signal which has been frequency-converted into a frequency band lower than a frequency band of said frequency modulated luminance signal.

7. A magnetic recording apparatus as claimed in claim 4 in which said switching means in said second recording mode arbitrarily selects the transporting speed of the magnetic tape to one of a tape transporting speed of a standard mode and a tape transporting speed of an extended mode and selectively forms on the magnetic tape one of a track pattern for the standard mode and a track pattern for the extended mode by use of one pair of rotary magnetic heads out of a pair constituted by said first and second rotary magnetic heads and a pair constituted by said third and fourth rotary magnetic heads.

8. A magnetic recording apparatus as claimed in claim 1 in which said first and third rotary magnetic heads have gaps of a first azimuth angle and said second and fourth rotary heads have gaps of a second azimuth angle, said first through fourth rotary magnetic heads having mutually different height positions on said rotary body so that said third rotary magnetic head has a height position higher than the height positions of said second and fourth rotary magnetic heads, a difference in the height positions of said first and third rotary magnetic heads being such that a pattern interval corresponding to approximately one field is formed between two tracks formed by said first and third rotary magnetic heads, a difference in the height positions of said second and fourth rotary magnetic heads being such that a pattern interval corresponding to approximately one field is formed between two tracks formed by said second and fourth rotary magnetic heads, said recording means supplying a first information signal to said first and second rotary magnetic heads and supplying a second information signal to said third and fourth rotary magnetic heads, a track formed by said fourth rotary magnetic head out of two parallel tracks simultaneously formed by said second and fourth rotary magnetic heads being formed in a guard band region between two parallel tracks simultaneously formed by said first and third rotary magnetic heads.

9. A magnetic recording apparatus as claimed in claim 8 in which said recording means comprises switching means, said switching means in a first recording mode supplying said first information signal to said first and second rotary magnetic heads and supplying said second information signal to said third and fourth rotary magnetic heads, said switching means in a second recording mode supplying a third information signal to only one pair of rotary magnetic heads out of a pair constituted by said first and second rotary magnetic heads and a pair constituted by said third and fourth rotary magnetic heads.

10. A magnetic recording apparatus as claimed in claim 9 in which said recording means in said second recording mode records said third information signal by a pair of lower rotary magnetic heads out of a pair constituted by said first and second rotary magnetic heads and a pair constituted by said third and fourth rotary magnetic heads when a transporting direction of the magnetic tape generally coincides with scanning directions of said first through fourth rotary magnetic heads, said recording means in said second recording mode recording said third information signal by a pair of upper rotary magnetic heads out of a pair constituted by said first and second rotary magnetic heads and a pair constituted by said third and fourth rotary magnetic heads when the transporting direction of the magnetic tape is generally opposite to the scanning directions of said first through fourth rotary magnetic heads.

11. A magnetic recording apparatus as claimed in claim 8 in which said first through fourth rotary magnetic heads have such track widths that two rotary magnetic heads which record one of said first and second information signals having a wider recording frequency band have large track widths compared to track widths of the remaining two rotary magnetic heads.

* * * * *